(12) United States Patent
Higuchi et al.

(10) Patent No.: US 11,267,998 B2
(45) Date of Patent: Mar. 8, 2022

(54) PRESSURE-SENSITIVE ADHESIVE SHEET

(71) Applicant: NITTO DENKO CORPORATION, Ibaraki (JP)

(72) Inventors: Naoaki Higuchi, Ibaraki (JP); Shuuhei Yamamoto, Ibaraki (JP)

(73) Assignee: NITTO DENKO CORPORATION, Ibaraki ( * ) Notice: Subject to any disclaimer, the term of this patent is extended or adjusted under 35 U.S.C. 154(b) by 184 days.

(21) Appl. No.: 16/617,221

(22) PCT Filed: May 23, 2018

(86) PCT No.: PCT/JP2018/019779
§ 371 (c)(1),
(2) Date: Nov. 26, 2019

(87) PCT Pub. No.: WO2018/221336
PCT Pub. Date: Dec. 6, 2018

(65) Prior Publication Data
US 2021/0292611 A1 Sep. 23, 2021

(30) Foreign Application Priority Data
May 31, 2017 (JP) .............................. JP2017-108458

(51) Int. Cl.
*C09J 7/38* (2018.01)
*C09J 7/22* (2018.01)
(Continued)

(52) U.S. Cl.
CPC ............... *C09J 133/08* (2013.01); *B32B 7/14* (2013.01); *B32B 27/065* (2013.01); *C09J 7/22* (2018.01);
(Continued)

(58) Field of Classification Search
CPC ..... C09J 133/08; C09J 7/38; C09J 7/22; C09J 7/385; C09J 7/255; C09J 2301/20;
(Continued)

(56) References Cited

U.S. PATENT DOCUMENTS

| | | |
|---|---|---|
| 2017/0174944 A1 | 6/2017 | Kato et al. |
| 2017/0267897 A1 | 9/2017 | Yamamoto et al. |
| 2018/0072920 A1 | 3/2018 | Kaneda et al. |

FOREIGN PATENT DOCUMENTS

| | | |
|---|---|---|
| CN | 106164199 A | 11/2016 |
| JP | 59-78285 A | 5/1984 |

(Continued)

OTHER PUBLICATIONS

The First Office Action dated Apr. 20, 2021, from the China National Intellectual Property Administration in application No. 201880035782.9.
(Continued)

*Primary Examiner* — Patricia L. Nordmeyer
(74) *Attorney, Agent, or Firm* — Sughrue Mion, PLLC

(57) ABSTRACT

Provided is a PSA sheet capable of suitably preventing bubble formation caused by outgassing. This invention provides a PSA sheet comprising a PSA layer that forms an adhesive face. In an aging test where the adhesive face is press-bonded to a glass plate and stored at 50° C. for 24 hours, the PSA sheet has at least 5% post-aging non-bonding area Sa, with Sa defined as the ratio of all areas non-bonding to the glass plate relative to the total area of the adhesive face. The non-bonding areas have parts linearly extending along the adhesive face.

15 Claims, 4 Drawing Sheets

(51) Int. Cl.
*B32B 7/14* (2006.01)
*B32B 27/06* (2006.01)
*C09J 133/08* (2006.01)
*C09J 7/25* (2018.01)

(52) U.S. Cl.
CPC ............... *C09J 7/255* (2018.01); *C09J 7/38* (2018.01); *C09J 7/385* (2018.01); *C09J 2301/124* (2020.08); *C09J 2301/20* (2020.08); *C09J 2407/00* (2013.01); *C09J 2429/00* (2013.01); *C09J 2433/00* (2013.01); *C09J 2467/006* (2013.01); *C09J 2469/00* (2013.01); *C09J 2475/00* (2013.01); *Y10T 428/28* (2015.01)

(58) Field of Classification Search
CPC ............... C09J 2433/00; C09J 2469/00; C09J 2407/00; C09J 2301/124; C09J 2475/00; C09J 2429/00; C09J 2467/006; B32B 7/14; B32B 27/065; Y10T 428/28
See application file for complete search history.

(56) References Cited

FOREIGN PATENT DOCUMENTS

| | | |
|---|---|---|
| JP | 2002-544364 A | 12/2002 |
| JP | 2003-531253 A | 10/2003 |
| JP | 2003-342533 A | 12/2003 |
| JP | 2005-298543 A | 10/2005 |
| JP | 2006-070273 A | 3/2006 |
| WO | 98/29516 A1 | 7/1998 |
| WO | 00/69985 A1 | 11/2000 |
| WO | 01/81013 A1 | 11/2001 |
| WO | 2016/084948 A1 | 6/2016 |
| WO | 2016/163537 A1 | 10/2016 |
| WO | 2017/022749 A1 | 2/2017 |

OTHER PUBLICATIONS

International Search Report for PCT/JP2018/019779 dated Aug. 21, 2018 (PCT/ISA/210).
Notice of Reasons for Refusal dated Apr. 8, 2021 by the Japanese Patent Office in application No. 2017-108458.
Second Office Action dated Sep. 14, 2021 from The State Intellectual Property Office of P.R. of China in Application No. 201880035782.9.
Decision of Refusal dated Sep. 24, 2021 from the Japanese Patent office in Application No. 2017-108458.

PRESSURE-SENSITIVE ADHESIVE SHEET

TECHNICAL FIELD

The present invention relates to a pressure-sensitive adhesive sheet. This application is a National Stage of International Application No. PCT/JP2018/019779 filed May 23, 2018, claiming priority based on Japanese Patent Application No. 2017-108458 filed on May 31, 2017; the entire content thereof is incorporated herein by reference.

BACKGROUND ART

In general, pressure-sensitive adhesive (or PSA; the same applies hereinafter) has characteristics to be in a soft solid (viscoelastic) state in a room temperature range and easily adhere to adherend with some pressure. With the benefit of such properties, PSA is widely used in forms of substrate-supported PSA sheets having a PSA layer at least on one face of the substrate for purposes including fastening and surface protection of various articles and obtaining desirable appearances such as for decorative purposes.

With respect to conventional PSA sheets, when the PSA sheets are adhered to adherends, there have been cases where a fluid substance such as air is left between the PSA sheets and the adherends to form bubbles and the like (trapped air, etc.), thereby causing degradation of the appearances. Such bubbles and the like are not desirable, either, in view of their negative impact on the adhesive properties such as reduced adhesive strength. When applying a PSA sheet, to prevent formation of such bubbles or to provide features (or air release properties) to eliminate the sort of bubbles if formed, a known technique uses ridges formed on the surface of the release liner protecting the PSA layer surface of the PSA sheet so as to form grooves complimentary in shape to the ridges in the PSA layer surface (Patent Document 1). Air and the like that are to remain between the PSA sheet and the adherend can be eliminated through the grooves formed in the surface of the PSA layer.

CITATION LIST

Patent Literature

[Patent Document 1] Japanese Patent Application Publication No. 2006-70273

SUMMARY OF INVENTION

Technical Problem

Even if bubble-free adhesion is achieved between the PSA sheet and the adherend, however, gas may newly accumulate to form bubbles afterwards between the PSA sheet and the adherend. One of the causes of such late-forming bubbles is the gas release from the adherend, generally called "outgassing." The outgassing may occur due to evaporation of the adherend's water content that has been present initially or absorbed from the surroundings, volatilization of low molecular weight components such as additives and unreacted starting materials in the adherend production, decomposition of the adherend-forming materials, etc. With respect to the PSA sheet described in Patent Document 1 having grooves in the PSA layer surface formed by ridges on the release liner, after the adhesive face exposed upon removal of the release liner or the like is applied to an adherend, the PSA may flow to cause shrinkage or loss of the grooves, making it inadequate for preventing bubble formation caused by outgassing. With aging and increasing temperature, the outgassing can be facilitated, but the PSA tends to flow more easily as well. This makes it harder to prevent the outgassing bubble formation.

An objective of this invention is to provide a PSA sheet capable of suitably preventing outgassing bubble formation. Another related objective is to provide a composite body in which the PSA sheet is adhered on a member that is likely to outgas.

DESCRIPTION OF EMBODIMENTS

The present description provides a PSA sheet that comprises a PSA layer forming an adhesive face. The PSA sheet is characterized by having a percent post-aging non-bonding area Sa of 5% or higher. Here, the percent post-aging non-bonding area Sa is defined as, in an aging test where the adhesive face is press-bonded to a glass plate and the resultant is stored at 50° C. for 24 hours, the ratio of all areas non-bonding to the glass plate (areas not in contact with the glass plate) relative to the total area of the adhesive face. The non-bonding areas preferably have linearly extending parts along the adhesive face. Even when used in an application where outgassing can be expected from the adherend to which the PSA sheet is applied, the PSA sheet in such an embodiment have the non-bonding areas effectively serving as outgassing pathways, whereby it can inhibit formation of bubbles (gas accumulation) and growth of the bubbles caused by the gas outgassed and trapped between the adherend and the adhesive face.

The PSA sheet disclosed herein is preferably embodied such that the non-bonding areas after the aging test are formed continuously up to the edges of the adhesive face. This can further inhibit the formation and growth of bubbles caused by outgassing.

The PSA sheet according to some embodiments can be made to have indentations formed in the adhesive face, the indentations forming a pattern in planar view of the PSA layer, so that the post-aging-test non-bonding areas are formed along the pattern. In the PSA sheet having indentations in the adhesive face, the indentations may help prevent bubble formation during the application; on the other hand, when the PSA flows with aging, the indentations are likely to shrink or disappear, trapping the outgassed gas between the adherend and the adhesive face. Accordingly it is particularly significant to apply the art disclosed herein to inhibit the outgassing bubble formation.

In the PSA sheet having an indentation in the PSA layer surface as described above, the indentation preferably has a depth of 0.2 μm or greater. According to such a PSA sheet, good adhesive strength is likely to be obtained while assuring at least a certain percentage Sa of post-aging non-bonding areas.

In some embodiments of the PSA sheet disclosed herein, the PSA sheet can be made, having a coating layer placed on and partially covering the surface of the PSA layer, wherein the post-aging-test non-bonding areas are formed along the pattern arranged by the coating layer in planar view of the PSA layer. According to the PSA sheet in such an embodiment, air and the like left otherwise between the PSA sheet and the adherend can be eliminated along the coating layer during the application; in addition, even upon aging, at least the certain percent post-aging non-bonding area Sa can be secured along the coating layer to effectively prevent the outgassing bubble formation.

The PSA sheet according to some preferable embodiments is made such that the post-aging-test non-bonding areas form a lattice pattern. For instance, the lattice pattern may include one, two or more among a square lattice, rectangular lattice, rhombic lattice, triangular lattice, hexagonal lattice, etc. With respect to the non-bonding areas forming such a lattice, the linearly extending parts in the non-bonding areas include many intersections or junctions; and therefore, the outgassed gas can be released through various pathways along these non-bonding areas. Accordingly, it can better prevent the formation and growth of bubbles due to the outgassed gas trapped between the adhesive face and the adherend.

The PSA sheet disclosed herein preferably has a percent initial non-bonding area Si of 5% or higher and 35% or lower. The percent initial non-bonding area Si is defined as the ratio of all areas not in contact with the glass plate relative to the total area of the adhesive face immediately after the adhesive face is press-bonded to the glass plate. The PSA sheet satisfying the percent initial non-bonding area Si and the percent post-aging non-bonding area Sa show good air release properties when applied and can suitably inhibit outgassing bubble formation, etc. The non-bonding areas preferably have linearly extending parts along the adhesive face. This can better prevent bubble formation caused by air and the like enclosed during the application.

The PSA sheet disclosed herein can be preferably implemented in an embodiment comprising a film substrate and the PSA layer placed at least on one face of the film substrate. According to the PSA sheet having a film substrate like this, at least a certain percent post-aging non-bonding area Sa is likely to be stably obtained.

The present description provides a composite body comprising a PSA sheet disclosed herein, and a member having a surface formed of a plastic material having an outgassing amount of 100 μL/g or more in an outgassing test where it is heated at 85° C. for 15 hours; wherein the PSA sheet is adhered to the surface formed of the plastic material. While having an embodiment where the PSA sheet is adhered on the surface of a plastic material having such an outgassing amount, such a composite body is less susceptible to the outgassing bubble formation between the surface and the PSA sheet. Thus, the composite body may show excellent bonding reliability between the member and the PSA sheet.

The present description provides a composite body comprising a PSA sheet disclosed herein, and a member having a surface formed of a plastic material comprising at least one species selected from the group consisting of a polycarbonate resin, acrylic resin, polystyrene resin, acrylonitrile-butadiene-styrene copolymer resin and vinyl chloride resin; wherein the PSA sheet is adhered to the surface formed of the plastic material. In general, the plastic material is likely to outgas; however, according to the PSA sheet, the outgassing is less likely to cause bubble formation between the surface and the PSA sheet. Thus, the composite body may show excellent bonding reliability between the member and the PSA sheet.

DESCRIPTION OF EMBODIMENTS

Figure 1:
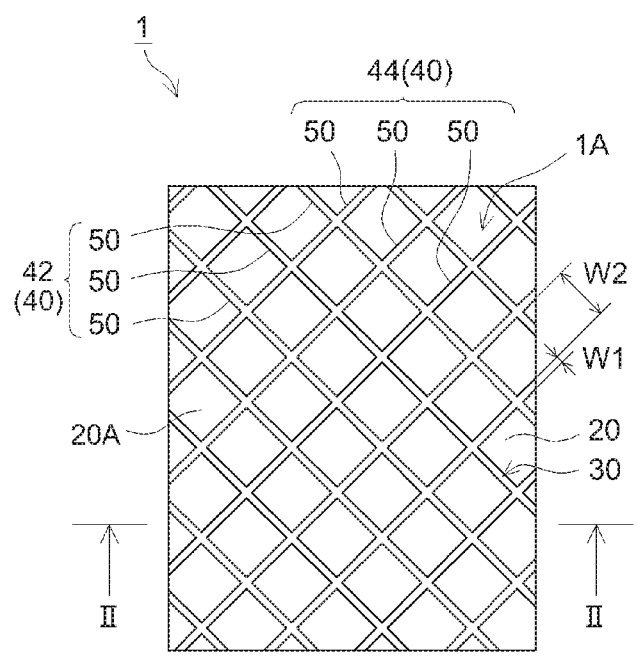
FIG. 1 shows a schematic top view of the PSA sheet according to an embodiment.

Preferred embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of actual products provided.

The concept of PSA sheet herein encompasses so-called PSA tapes, PSA labels, and PSA films. The PSA sheet disclosed herein can be in a roll form or in a flat sheet form. Alternatively, the sheet may be further processed into various forms.

<PSA Sheet>

First Embodiment

Figure 2:
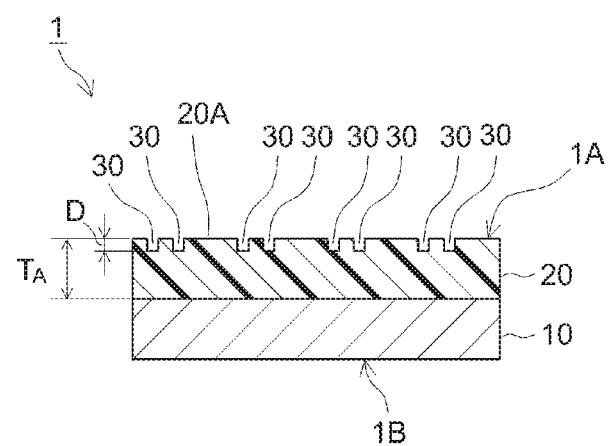
FIG. 2 shows a cross-sectional diagram at line II-II in FIG. 1.

FIG. 1 shows the PSA sheet according to an embodiment, schematically illustrating how it looks in top view when being applied to an adherend. FIG. 2 shows a cross-sectional diagram at line II-II in FIG. 1. With reference to these drawings, the PSA sheet in this embodiment is described.

As shown in FIGS. 1 and 2, PSA sheet 1 according to this embodiment has a layered structure formed of a film substrate 10 and a PSA layer 20. Film substrate 10 supports PSA layer 20. One face of PSA sheet 1 is an adhesive face 1A formed with a surface 20A of PSA layer 20. The other face 1B (on the film substrate 10 side) of PSA sheet 1 is a non-adhesive face. Such a PSA sheet having an adhesive face only on one side (i.e. a single-faced PSA sheet) is suited, for instance, when the reverse face of the adhesive face is required to have properties such as decorative and surface-protective properties or when it is used as a paint alternative sheet.

Surface 20A of PSA layer 20 has indentations 30. Indentations 30 form a certain pattern (an indented (recessed) pattern) 40 in planar view of PSA layer 20. In this embodiment, it forms an indented rhombic lattice pattern 40. When PSA sheet 1 is applied to an adherend, indented pattern 40 forms pathways for air and the like between PSA sheet 1 and the adherend, providing air release properties. PSA sheet 1 is formed so that, after an aging test where adhesive face 1A is press-bonded to a glass plate and the resultant is stored at 50° C. for 24 hours, of the total area of adhesive face 1A, the total percentage of non-bonding areas (indented areas), that is, the percent post-aging non-bonding area Sa, is at least 5% while non-bonding areas (with respect to the glass plate) are formed along indented pattern 40 on adhesive face 1A. This helps PSA sheet 1 maintain, even with aging after applied, the non-bonding areas capable of effectively serving as outgassing pathways between adhesive face 1A and the adherend surface. For instance, even when it is applied to a likely outgassing adherend such as polycarbonate resin, formation and growth of bubbles caused by the outgassing can be inhibited.

In particular, indented pattern 40 is formed of a first stripe pattern 42 and a second stripe pattern 44 that is placed to intersect the first stripe pattern 42.

The first stripe pattern 42 is formed of parts 50 (linearly extending parts) that run straight from one edge to another edge of adhesive face 1A. In this embodiment, these linearly extending parts 50 form linear indentations, that is, grooves. Accordingly, in this embodiment, linearly extending parts 50 can also be called grooves 50 in other words. Grooves 50 forming the first stripe pattern 42 are placed in parallel, spaced at intervals arranged in the width direction. In this embodiment, grooves 50 are placed at an angle such that their length directions intersect the edges (ends, limits) of the width direction of PSA sheet 1, with each groove reaching two edges (two sides) of adhesive face 1A. In this embodiment, the length direction of a groove 50 intersects an edge of the width direction of PSA sheet 1 at an angle of 45°.

Similar to the first stripe pattern 42, the second stripe pattern 44 is also formed of grooves 50 (linearly extending parts) that run straight from one edge to another edge of adhesive face 1A. These grooves 50 are placed in parallel at intervals arranged in the width direction. In this embodiment, grooves 50 are placed at an angle such that their length directions intersect the edges of the width direction of PSA sheet 1, with each groove reaching two edges (two sides) of adhesive face 1A.

In this embodiment, the first and second stripe patters 42 and 44 intersect each other, with grooves 50 forming the first stripe pattern 42 almost vertically intersecting grooves 50 forming the second stripe pattern 44. Accordingly, grooves 50 forming the first stripe pattern 42 partially overlap grooves 50 forming the second stripe pattern 44. Indented rhombic lattice pattern 40 is thereby formed.

In this embodiment, linearly extending parts (grooves 50 shown in FIG. 1) forming the indented pattern run straight, but are not limited to this. The linearly extending parts may run, for instance, in curved or zigzag lines. For instance, the linearly extending parts may have a wavy form. Examples of the wavy form include curvilinear forms such as sine waves, pseudo sine waves and circular-arc waves as well as non-curvilinear forms such as zigzags and triangular waves. Such a wavy pattern may be formed by layering two or more same or different waves in different phases, or in forms or patterns in reverse relationship, etc. The same applies to the linearly extending parts forming the coating layer pattern in the second embodiment described later. In these embodiments, the number of the linearly extending parts (grooves) can be selected based on the shape, size, etc., of the adhesive face of the PSA sheet; and therefore, it is not limited to a particular number.

Here, the lattice pattern typically refers to a pattern that includes two stripe patterns intersecting each other and encompasses not only a rhombic lattice as in the present embodiment, but also various lattice shapes such as a square lattice, a rectangular lattice and a triangular lattice. When the linearly extending parts (grooves in this embodiment) are straight, the angle (the acute angle) at an intersection of the two stripe patterns can be, for instance, in a range from 10° to 90° (preferably 45° to 90°, typically 60° to 90°). The lattice pattern disclosed herein also encompasses a pattern that includes a stripe pattern formed of several linearly extending parts with repeated bending, for instance, a pattern such as a hexagonal lattice. In such a pattern, adjacent linearly extending parts may be partially connected to one another.

In this embodiment, a groove 50 forming the first stripe pattern 42 has a width (W1 in FIG. 1) of about 200 µm; and similarly, a groove 50 forming the second stripe pattern 44 also has a width W1 of about 200 µm. The width W1 is, however, not limited to this. The width W1 can be selected, for instance, in the range between 0.01 mm and 2 mm. From the standpoint of readily obtaining a preferable percent post-aging non-bonding area Sa disclosed herein, the width W1 is advantageously 0.05 mm or greater, preferably 0.10 mm or greater, or more preferably 0.15 mm or greater. From the standpoint of better inhibiting the outgassing bubble formation, in some embodiments, the width W1 can be, for instance, 0.20 mm or greater, 0.25 mm or greater, 0.30 mm or greater, 0.40 mm or greater, or even 0.50 mm or greater. From the standpoint of the adhesive strength, the appearance, etc., the width W1 is usually preferably 1.2 mm or less, or more preferably 1.0 mm or less. In some embodiments, the width W1 can be, for instance, less than 0.70 mm, less than 0.50 mm, or even less than 0.40 mm. The width W1 of a groove forming the first stripe pattern and the width W1 of a groove forming the second stripe pattern may be the same or different.

In this embodiment, the interval (W2 in FIG. 1) between grooves 50 forming the first stripe pattern 42 is about 1.8 mm; and similarly the interval (W2 in FIG. 1) between grooves 50 forming the second stripe pattern 44 is also about 1.8 mm. The interval W2 is, however, not limited to this. The inter-groove interval W2 can be selected, for instance, in the range between 1.0 mm and 10 mm. This leads to an increased tendency to combine preferable percent post-aging non-bonding area Sa and adhesive strength in a well-balanced manner. Here, the inter-groove interval W2 refers to the width of the area between two adjacent grooves (linearly extending parts) in the adhesive face. From the standpoint of increasing the adhesive strength, etc., the interval W2 is more preferably 1.5 mm or greater, or yet more preferably 2.5 mm or greater. From the standpoint of readily obtaining a preferable percent post-aging non-bonding area Sa disclosed herein, the interval W2 can be, for instance, 8 mm or less, 5 mm or less, or even 3 mm or less. The interval W2 between grooves forming the second stripe pattern can also be preferably selected in the range exemplified for the interval W2 between grooves forming the first stripe pattern. The interval W2 between grooves forming the first stripe pattern and the interval W2 between grooves forming the second stripe pattern can be the same or different. It is preferable that the interval W2 between grooves forming each stripe pattern is more or less constant among the corresponding areas in the stripe pattern.

In this embodiment, grooves 50 forming the first stripe pattern 42 have a pitch of about 2.0 mm; and similarly, grooves 50 forming the second stripe pattern 44 also have a pitch of about 2.0 mm. The pitch is, however, not limited to this. From the standpoint of combining adhesive strength and anti-bubble properties in a well-balanced manner, the pitch is preferably in the range between 1.0 mm and 20 mm. From the standpoint of increasing the adhesive strength, the pitch can be, for instance, 1.5 mm or greater, 2 mm or greater, or even 2.5 mm or greater. From the standpoint of enhancing the air release properties, the pitch can be, for instance, 15 mm or less, 12 mm or less, or even 5 mm or less. The pitch refers to the distance (interval) between the centerlines of the width directions (i.e. the lengthwise centerlines) of the grooves.

In this embodiment, a groove 50 forming the first stripe pattern 42 has a depth (D in FIG. 2) of about 2 μm; and similarly, a groove 50 forming the second stripe pattern 44 also has a depth D of about 2 μm. The depth D is, however, not limited to this. The depth D of the indented pattern (the depth of a groove forming the indented pattern in this embodiment) is, for instance, 0.1 μm or greater and can be suitably selected in the range from 0.1 μm up to the PSA layer's thickness $T_A$. In a preferable embodiment, from the standpoint of readily obtaining at least a certain percent post-aging non-bonding area Sa, the groove depth D can be, for instance, 0.2 μm or greater. From such a standpoint, the groove depth D can be, for instance, 0.5 μm or greater, 0.7 μm or greater, 1.0 μm or greater, 1.5 μm or greater, or even 1.7 μm or greater. From the standpoint of the ease of forming the indented pattern, the groove depth D can be, for instance, 3 μm or less, 2.7 μm or less, or even 2.5 μm or less.

The ratio of the groove depth D to the PSA layer's thickness $T_A$, that is, $D/T_A$ can be, for instance, 0.05 or higher, 0.10 or higher, 0.15 or higher, or even 0.20 or higher. With increasing $D/T_A$, shrinkage of the indented pattern with aging tends to be more likely inhibited. From the standpoint of the ease of forming the indented pattern, $D/T_A$ can be, for instance, 0.90 or lower, 0.80 or lower, or even 0.70 or lower.

In a preferable embodiment, in a groove forming the indented pattern, the ratio of its width W1 to its depth D, that is, W1/D, is about 20 or higher. From the standpoint of better inhibiting the outgassing bubble formation, W1/D can be, for instance, 30 or higher, 50 or higher, 70 or higher, or even 90 or higher. From the standpoint of the balance between adhesion and anti-bubble properties, W1/D is usually suitably 500 or lower, for instance, possibly 300 or lower, 250 or lower, 200 or lower, or even 165 or lower.

In the PSA sheet disclosed herein, the ratio of indented pattern areas in the total area of the adhesive face is suitably 50% or lower, or preferably 40% or lower. This can assure good adhesive properties at the time of application to an adherend. In some embodiments, the ratio of indented pattern areas can be, for instance, 35% or lower, or even 30% or lower. From the standpoint of readily obtaining a preferable percent post-aging non-bonding area Sa disclosed herein, the ratio of indented pattern areas is preferably above 5% or possibly above 7%, above 10%, above 12%, above 15%, or even above 17%.

As used herein, the adhesive face of a PSA sheet refers to a face that allows adhesion of the USA sheet to an adherend by the adhesiveness of the PSA layer exposed on the adhesive face. On the adhesive face, the PSA layer may be exposed over the entire area or may be partially covered with a coating layer, for instance, as in the second embodiment described later. In some areas of the adhesive face, there may be a depression in the adhesive face (an indentation; a depression in the PSA layer surface in this embodiment) or a PSA-layer-free area. Thus, the entire area of the adhesive face referred to here include the area of the coating layer partially covering the PSA layer, the area of the depression in the adhesive face, and the area free of the PSA layer.

Figure 3:
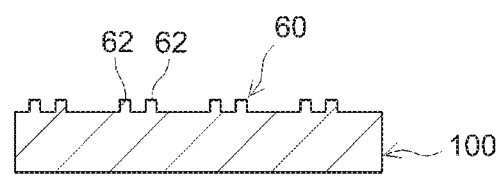
FIG. 3 shows a cross-sectional diagram illustrating a release liner used in preparing the PSA sheet according to an embodiment.

For instance, as shown in FIG. 3, PSA layer 20 having indented rhombic lattice pattern 40 can be prepared, using a release liner 100 having a release face on which a structure corresponding to the indented pattern 40 (i.e. a raised (protruded) rhombic lattice pattern 60) is formed. More specifically, the PSA layer having the indented pattern corresponding to the raised pattern can be prepared by a method where a fluid PSA composition is applied to a release face having the prescribed raised pattern and allowed to cure on the release face to form a PSA layer or by a method where a pre-formed PSA layer is pressed and deformed (molded) with the release face.

Figure 4:
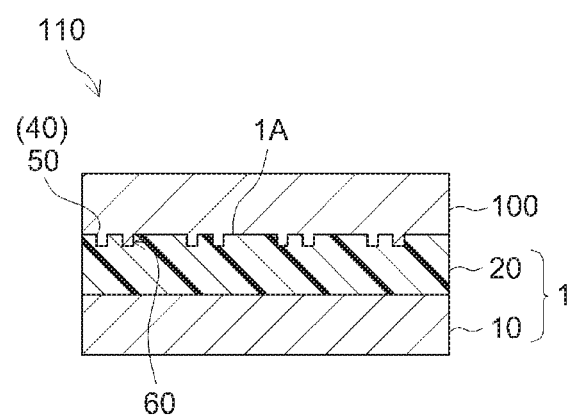
FIG. 4 shows a schematic cross-sectional diagram of the release-linered PSA sheet according to an embodiment.

For instance, as shown in FIG. 4, the PSA sheet prior to use (i.e. before applied to an adherend) may be configured as a release-linered PSA sheet 110 having a PSA sheet 1 and a release liner 100 covering its adhesive face 1A. According to such a configuration, release liner 100 can prevent adhesive face 1A from getting dirty or degrading while preventing deformation (typically shrinkage and loss of the width and/or depth of groove 50) in indented pattern 40 caused by flowing of the PSA. To use PSA sheet 1, release liner 100 is removed and the exposed adhesive face 1A is adhered to an adherend.

In the PSA sheet having a PSA layer on one face of a substrate, with the substrate's backside (on the reverse side of the PSA layer-bearing face) formed as a release face having a raised pattern, the PSA sheet(s) can be wound or layered to allow the release face to come in contact with the adhesive face, thereby using the release face to protect the adhesive face and maintain the structure of the indented pattern. In other words, it may be in an embodiment where the substrate of the single-faced PSA sheet also serves as the release liner thereof.

The raised pattern on the release face may have a structure corresponding to the indented pattern on the PSA layer. In some embodiments, the release face's raised pattern is complimentary in shape to the PSA layer's indented pattern. In this embodiment, with respect to the release fac's raised pattern, a raised pattern 60 may be formed with linearly extending parts 62 complimentary in shape and orientation to grooves 50 forming the first and second stripe patterns 42 and 44. Linearly extending parts 62 constitute raised lines, or ridges in other words. Thus, in this embodiment, linearly extending parts 62 can be referred to as ridges 62. The shape and orientation of ridges 62 can be selected to form raised pattern 60 complimentary in structure to indented pattern 40. As or other possible orientations, shapes and the like of the raised-pattern-forming ridges can be perceived from the orientations and shapes of the grooves described earlier; and therefore, further details are omitted.

The sizes (e.g. the indented pattern's width W1, interval W2, depth D and the PSA layer's thickness $T_A$) of the respective parts of the PSA layer refer to their sizes in the PSA sheet before applied to an adherend. The indented pattern's width W1 and interval W2 can be determined by optical microscopic analysis of the adhesive face. The indented pattern's depth D can be determined by SEM (scanning electron microscopy) or TEM (transmission electron microscopy) analysis of a cross section of the PSA layer. When the adhesive fac is covered with a release liner, desirably the analysis is conducted within 30 minutes (preferably within 15 minutes) after the adhesive face is exposed by removal of the release liner; or the analytical sample is solidified in shape. The shape can be solidified by a known technique such as cooling and resin embedding. The PSA layer's thickness $T_A$ refers to the thickness of the PSA layer measured where the indented pattern is not present, as shown in FIG. 2.

The sizes (width, interval, height, etc.) of the respective parts of the raised pattern on the release liner's release face can be obtained by the same methods as for the indented pattern. It is presumed that immediately after the release liner is removed from the adhesive face, the sizes of the respective parts of the indented pattern on the PSA surface reflect more or less the sizes of the respective parts of the raised pattern on the release face; and therefore, the width, interval and height of the release face's raised pattern can be used as approximate values for the width W1, interval W2 and depth D of the adhesive face's indented pattern.

Second Embodiment

Figure 5:
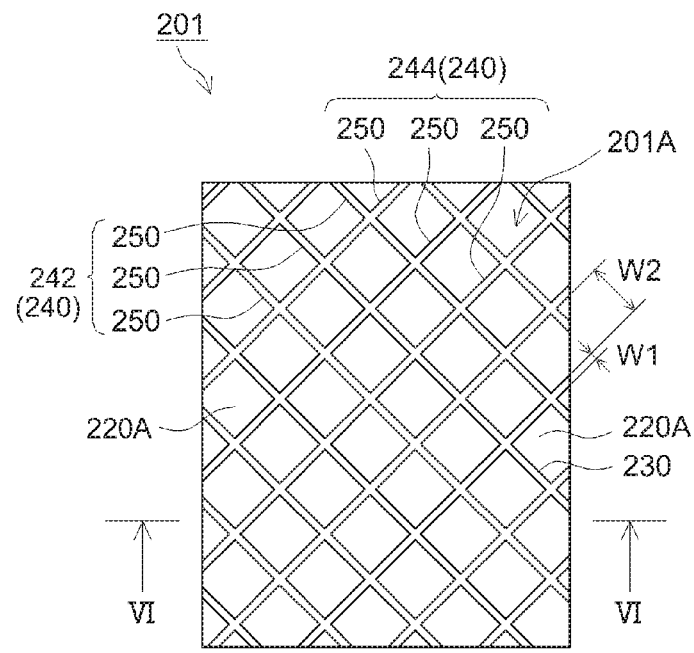
FIG. 5 shows a schematic cross-sectional diagram of the PSA sheet according to another embodiment.
Figure 6:
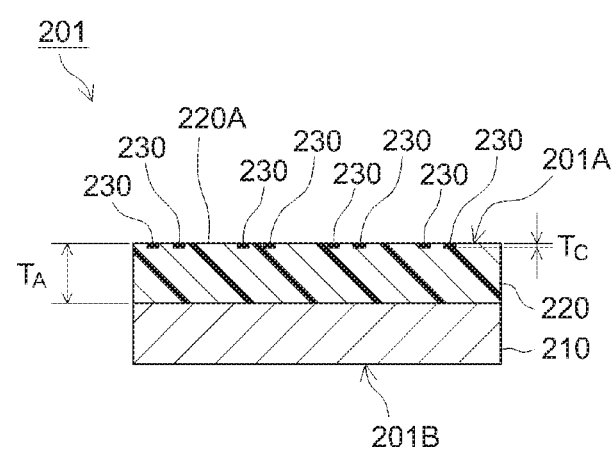
FIG. 6 shows a cross-sectional diagram at line VI-VI in FIG. 5.

FIG. 5 shows the PSA sheet according to another embodiment, schematically illustrating how it looks in top view when being applied to an adherend. FIG. 6 shows a cross-sectional diagram at line VI-VI in FIG. 5. With reference to these drawings, the PSA sheet in this embodiment is described.

As shown in FIGS. 5 and 6, PSA sheet 201 according to this embodiment has a layered structure formed of a film substrate 210 and a PSA layer 220. Film substrate 210 supports PSA layer 220. One face of PSA sheet 201 is an adhesive face 201A where the surface 220A of PSA layer 220 is partially exposed. The other face 201B (on the film substrate 210 side) of PSA sheet 201 is a non-adhesive face.

On the surface 220A of PSA layer 220, a coating layer 230 is partially placed. In other words, the PSA layer surface 220A is partially covered with coating layer 230. By this, adhesive face 201A has coating layer-free areas where PSA layer 220 is exposed and coating layer-bearing areas where PSA layer 220 is covered with coating layer 230. That is, adhesive face 201A is formed with the exposed PSA layer 220 surface and the coating layer surface. Coating layer 230 forms a certain pattern (coating layer pattern) 240 in planar view of PSA layer 220; in this embodiment, it forms a rhombic lattice coating layer pattern 240. When PSA sheet 201 is applied to an adherend, coating layer pattern 240 forms pathways for air and the like between PSA sheet 201 and the adherend, providing air release properties. PSA sheet 201 is formed so that, after an aging test where adhesive face 201A is press-bonded to a glass plate and the resultant is stored at 50° C. for 24 hours, of the total area of adhesive face 201A, the total percentage of non-bonding areas, that is, the percent post-aging non-bonding area Sa, is at least 5% while non-bonding areas (with respect to the glass plate) are formed along coating layer pattern 240 on adhesive face 1A. This helps PSA sheet 201 maintain, even with aging after applied, the non-bonding areas capable of effectively serving as outgassing pathways between adhesive face 201A and the adherend surface. For instance, even when it is applied to a likely outgassing adherend such as polycarbonate resin, formation and growth of bubbles caused by the outgassing can be inhibited.

Coating layer pattern 240 according to this embodiment is formed of a first stripe pattern 242 and a second stripe pattern 244 that is arranged to intersect the first stripe pattern 242.

The first stripe pattern 242 is formed of parts 250 (linearly extending parts, stripes (coating stripes) in this embodiment) that run straight from one edge to another edge of adhesive face 201A. Stripes 250 forming the first stripe pattern 242 are placed in parallel, spaced at intervals arranged in the width direction. In this embodiment, stripes 250 are placed at an angle such that their length directions intersect the edges (ends, limits) of the width direction of PSA sheet 201, with each stripe reaching two edges (two sides) of adhesive face 201A. In this embodiment the length direction of a stripe 250 intersects an edge of the width direction of PSA sheet 201 at an angle of 45°.

Similar to the first stripe pattern 242, the second stripe pattern 244 is also formed of parts 250 (linearly extending parts, stripes in this embodiment) that run straight from one edge to another edge of adhesive face 201A. These stripes 250 are placed in parallel at intervals arranged in the width direction. In this embodiment, stripes 250 are placed at an angle such that their length directions intersect the edges of the width direction of PSA sheet 201, with each stripe reaching two edges (two sides) of adhesive face 201A.

In this embodiment, the first and second stripe patters 242 and 244 intersect each other, with stripes 250 forming the first stripe pattern 242 almost vertically intersecting stripes 250 forming the second stripe pattern 244. Accordingly, stripes 250 forming the first stripe pattern 242 partially overlap stripes 250 forming the second stripe pattern 244. Rhombic lattice coating layer pattern 240 is thereby formed.

In this embodiment, a stripe 250 forming the first stripe pattern 242 has a width (W1 in FIG. 5) of about 200 μm; and similarly, a stripe 250 forming the second stripe pattern 244 also has a width W1 of about 200 μm. The width W1 is, however, not limited to this. The width W1 can be selected, for instance, in the range between 0.01 mm and 2 mm. From the standpoint of readily obtaining a preferable percent post-aging non-bonding area Sa disclosed herein, the width W1 is advantageously 0.05 mm or greater, preferably 0.10 mm or greater, or more preferably 0.15 mm or greater. From the standpoint of better inhibiting the outgassing bubble formation, in some embodiments, the width W1 can be, for instance, 0.20 mm or greater, 0.25 mm or greater, 0.30 mm or greater, 0.40 mm or greater, or even 0.50 mm or greater. From the standpoint of the adhesive strength, the appearance, etc., the width W1 is usually preferably 1.2 mm or less, or more preferably 1.0 mm or less. In some embodiments, the width W1 can be, for instance, less than 0.70 mm, less than 0.50 mm, or even less than 0.40 mm. The width W1 of a stripe forming the first stripe pattern and the width W1 of a stripe forming the second stripe pattern may be the same or different.

In this embodiment, the interval (W2 in FIG. 5) between stripes 250 forming the first stripe pattern 242 is about 1.8 mm; and similarly, the interval (W2 in FIG. 5) between stripes 250 forming the second stripe pattern 244 is also about 1.8 mm. The interval W2 is, however, not limited to this. The interval W2 can be selected, for instance, in the range between 1.0 mm and 10 mm. This leads to an increased tendency to combine preferable percent post-aging non-bonding area Sa and adhesive strength in a well-balanced manner. Here, the interval W2 of stripes refers to the width of the area between two adjacent stripes (linearly extending parts) in the adhesive face. From the standpoint of increasing the adhesive strength, etc., the interval W2 is more preferably 1.5 mm or greater, or yet more preferably 2.5 mm or greater. From the standpoint of readily obtaining a preferable percent post-aging non-bonding area Sa disclosed herein, the interval W2 can be, for instance, 8 mm or less, 5 mm or less, or even 3 mm or less. The interval W2 between stripes forming the second stripe pattern can also be preferably selected in the range exemplified for the interval W2 between stripes forming the first stripe pattern. The interval W2 between stripes forming the first stripe pattern and the interval W2 between stripes forming the second stripe pattern can be the same or different. It is preferable that the interval W2 between stripes forming each stripe pattern is more or less constant among the corresponding areas in the stripe pattern.

In this embodiment, stripes 250 forming the first stripe pattern 242 have a pitch of about 2.0 mm; and similarly stripes 250 forming the second stripe pattern 244 also have a pitch of about 2.0 mm. The pitch is, however, not limited to this. From the standpoint of combining adhesive strength and anti-bubble properties in a well-balanced manner, the pitch is preferably in the range between 1.0 mm and 20 mm. From the standpoint of increasing the adhesive strength, the pitch can be, for instance, 1.5 mm or greater, 2 mm or greater, or even 2.5 mm or greater. From the standpoint of enhancing the anti-bubble properties, the pitch can be, for instance, 15 mm or less, 12 mm or less, or even 5 mm or less. The pitch refers to the distance (interval) between the centerlines of the width directions (i.e. the lengthwise centerlines) of the stripes.

In this embodiment, a stripe 250 forming the first stripe pattern 242 has a thickness ($T_C$ in FIG. 6) of about 2 μm; and similarly; a stripe 250 forming the second stripe pattern 244 also has a thickness $T_C$ of about 2 μm. The thickness $T_C$ is, however, not limited to this. The thickness $T_C$ of the coating layer (the thickness of a stripe forming the coating layer pattern in this embodiment) is usually suitably 0.1 μm or greater, or preferably 0.2 μm or greater. This avoids excessive sinking of the coating layer into the PSA layer caused by flowing of the PSA with aging and facilitates to obtain at least a certain percent post-aging non-bonding area Sa. From such a standpoint, the coating layer's thickness $T_C$ can be, for instance, 0.5 μm or greater, 0.7 μm or greater, 1.0 μm or greater, 1.5 μm or greater, or even 1.7 μm or greater. From the standpoint of the adhesion to adherend and the appearance, the coating layer's thickness $T_C$ is usually suitably 10 μm or less, for instance, possibly 5 μm or less, 3 μm or less, 2.7 μm or less, or even 2.5 μm or less. A small thickness $T_C$ of the coating layer is preferable also in view of making the PSA sheet thinner.

The ratio of the coating layer's thickness $T_C$ to the PSA layer's thickness $T_A$, that is, $T_C/T_A$, can be, for instance, 0.05 or higher, 0.10 or higher, 0.15 or higher, or even 0.20 or higher. With increasing $T_C/T_A$, it tends to be easier to avoid excessive sinking of the coating layer into the PSA layer caused by flowing of the PSA with aging and to obtain at least the prescribed percent post-aging non-bonding area Sa. In some embodiments, $T_C/T_A$ can be 0.30 or higher, or even 0.40 or higher. From the standpoint of the adhesion to adherend and the appearance, the coating layer's thickness $T_C$ is preferably comparable to or smaller than the PSA layer's thickness $T_A$. From such a standpoint. $T_C/T_A$ can be, for instance, 0.90 or lower, 0.80 or lower, or even 0.70 or lower.

In a preferable embodiment, in a stripe forming the coating layer pattern, the ratio of its width W1 to its thickness $T_C$, that is, W1/$T_C$, is about 20 or higher. From the standpoint of better inhibiting the outgassing bubble formation. W1/$T_C$ can be, for instance, 30 or higher, 50 or higher, 70 or higher, or even 90 or higher. From the standpoint of the balance between adhesion and anti-bubble properties. W1/$T_C$ is usually suitably 500 or lower, for instance, possibly 300 or lower, 250 or lower, 200 or lower, or even 165 or lower.

The sizes (e.g. the width W1 and interval W2 of stripes forming the coating layer, coating layer's thickness $T_C$ and the PSA layer's thickness $T_A$) of the respective parts of the coating layer and PSA layer refer to their sizes in the PSA sheet before applied to an adherend. The width W1 and interval W2 of stripes forming the coating layer pattern can be determined by optical microscopic analysis of the adhesive face. The coating layer's thickness $T_C$ can be determined by SEM (scanning electron microscopy) or TEM (transmission electron microscopy) analysis of across section of the PSA layer. In the coating layer pattern (e.g. in a lattice form) where several stripes are arranged intersecting one another, the coating layer's thickness $T_C$ is measured with respect to non-intersecting areas in the stripes. The PSA layer's thickness $T_A$ is measured where the coating layer is absent on the surface.

In the PSA sheet disclosed herein, the ratio of areas covered with coating layer 230 (coating layer-bearing areas) in the total area of the adhesive face is suitably 50% or lower, or preferably 40% or lower. This can assure good adhesive properties at the time of application to an adherend. In some embodiments, the ratio of indented pattern areas can be, for instance, 35% or lower, or even 30% or lower. From the standpoint of readily obtaining a preferable percent post-aging non-bonding area Sa disclosed herein, the ratio of indented pattern areas is preferably above 5% or possibly above 7%, above 10%, above 12%, above 15%, or even above 17%.

The method for placing the coating layer on the PSA layer surface is not particularly limited. In typical, a method as described next is employed. In particular, a coating layer-forming composition is prepared as necessary by dissolution or dispersion in a suitable solvent. Subsequently, by employing a suitable method among various known or commonly-used printing methods, the composition is provided to a release face of a releasable support (or a coating layer transferring film, typically a release liner) and allowed to cure. The releasable support surface on which the coating layer is formed is brought into contact with the PSA layer surface to transfer the coating layer onto the PSA layer surface. The coating layer is thus partially placed on the PSA layer surface. For instance, a desirable coating layer pattern such as a lattice pattern can be preferably formed by employing a method such as offset printing, silk screen printing, letterpress printing, flexographic printing, gravure printing, and inkjet printing. From the standpoint of the air release properties during the application, gravure printing is more preferable. Alternatively, the same embodiment can also be obtained by forming a coating layer on a release face as described above and further forming a PSA layer to cover the coating layer. In case of a substrate-supported PSA sheet, the resulting PSA layer is subsequently transferred onto a surface of a film substrate. Based on technical common knowledge in the pertinent field, a skilled person can employ a method as described above, select a coating layer material in view of the wetting properties relative to the release face of the releasable support, adjust the viscosity of the coating layer-forming composition to a suitable range, and further select, for instance, a suitable printing means to form a coating layer disclosed herein.

(Properties of PSA Sheet, Etc.)

The PSA sheet disclosed herein has a percent post-aging non-bonding area Sa of at least 5%, wherein the adhesive face is formed so that post-aging-test non-bonding areas have linearly extending parts. The percent post-aging non-bonding area Sa is determined as, in an aging test where the adhesive face is press-bonded to a glass plate and stored at 50° C. for 24 hours, the ratio of all areas not in contact with the glass plate in the total area of the adhesive face. The percent post-aging non-bonding area Sa can be obtained from the PSA sheet adhered on one face of the glass plate by subjecting a microscopic image of the PSA sheet taken from the opposite face (i.e. through the glass plate) to image analysis (e.g. binarization using general image processing software) to determine the percentage of the non-bonding areas. For the observation of the PSA sheet, for instance, a digital microscope available from Keyene Corporation can be used. The same method is employed in Examples described later.

The percent post-aging non-bonding area Sa can be adjusted, for instance, through the structure of the adhesive face, the PSA layer's thickness $T_A$, and the composition of the PSA forming the PSA layer. Here, for instance, in an embodiment having an indented lattice pattern on the PSA layer surface as in the first embodiment, the structure of the adhesive face conceptually includes the width W1, interval W2 and depth D of the grooves forming the indented pattern, the shape of a groove in planar view of the adhesive face and the angle at which the groove crosses an edge of the width direction (a lengthwise edge) of the PSA sheet. The composition of the PSA layer conceptually includes the base polymer's monomer composition (species and their quantitative ratio), the species of crosslinking agent and its amount used in the PSA layer formed using a crosslinking agent, the species of tackifier resin and its amount used in the PSA layer comprising a tackifier resin, and the gel fraction of the PSA layer.

It is noted that the glass plate is used to determine the percent post-aging non-bonding area Sa because, as practically no outgassing is expected from the glass plate under the aging test conditions, the influence of outgassing can be eliminated to properly test the percent post-aging non-bonding area Sa. The aging test conditions are designed to store the PSA sheet in a temperature range above room temperature to facilitate flowing of the PSA and allow efficient testing of how well the non-bonding areas hold.

A typical PSA sheet has a smooth and uniform adhesive face; thus, when the PSA sheet is applied to an adherend, any air left between the PSA sheet and the adherend is likely to be sealed to form bubbles. With respect to such a smooth and uniform adhesive face, because the adhesive face and the adherend undergo further bonding in the aging test, the percent post-aging non-bonding area Sa is usually below 3%, typically below 1%; thus, it is not suited for inhibiting the formation and growth of bubbles caused by outgassing.

In a PSA sheet having indentations such as grooves on the PSA layer surface or a PSA sheet having a PSA layer partially covered with a coating layer, the indentations or the coating layer can be used to form pathways for air and the like between the PSA sheet and the adherend; and the air and the like left otherwise between the PSA sheet and the adherend can be eliminated to inhibit bubble formation during the application. However, because the PSA forming the PSA layer is a viscoelastic body, it flows (deforms) with aging or under a pressure, etc. Such flowing of the PSA may cause the indentations to shrink or disappear, or cause the mating layer to further sink into the PSA layer. As a result, the structure used as pathways for air and the like during the application may not work out as pathways for the gas outgassed afterwards, or the effect may be insufficient.

According to the PSA sheet having at least 5% post-aging non-bonding area Sa, the post-aging-test non-bonding areas can be used to effectively serve as outgassing pathways. This can suitably inhibit the formation and growth of bubbles caused by outgassing. From the standpoint of better inhibiting outgassing bubble formation, the percent post-aging non-bonding area Sa is preferably 7% or higher, or more preferably 10% or higher. From the standpoint of obtaining greater effect, in some embodiments, the percent post-aging non-bonding area Sa can be, for instance, 12% or higher, 15% or higher, or even 17% or higher. The maximum percent post-aging non-bonding area Sa is not particularly limited. From the standpoint of the adhesion to adherend, etc., in some embodiments, the percent post-aging non-bonding area Sa can be, for instance, 35% or lower, 30% or lower, or even 25% or lower. It may also be advantageous to have a low percent post-aging non-bonding area Sa in view of increasing the electric conductivity or thermal conductivity via the PSA sheet.

The PSA sheet disclosed herein preferably has a percent initial non-bonding area Si higher than 5% relative to a glass plate. Here, the percent initial non-bonding area Si is defined as the ratio of areas non-bonding to (not in contact with) the glass plate in the adhesive face immediately after the adhesive face is applied to the glass plate and press-bonded by autoclaving (30° C., 0.5 MPa) for 15 minutes (i.e. immediately after removed from the autoclave). The percent initial non-bonding area Si is determined by the same method as for the percent post-aging non-bonding area Sa.

As described above, because practically no outgassing occurs from the glass plate under the aging test conditions, the bonding of the adhesive face to the glass plate will advance further in the aging test. Thus, to maintain the percent post-aging non-bonding area Sa at or above 5%, the percent initial non-bonding area Si is preferably higher than 5%. From the standpoint of obtaining a PSA sheet having a higher percent post-aging non-bonding area Sa, in some embodiments, the percent initial non-bonding area Si can be, for instance, above 7%, above 10%, above 12%, above 15%, or even above 17%. A higher percent initial non-bonding area Si may also be advantageous in view of enhancing the anti-bubble properties. The percent initial non-bonding area Si is usually suitably 50% or lower, preferably 40% or lower, or more preferably 35% or lower. From the standpoint of the adhesion to adherend, etc., in some embodiments, the percent initial non-bonding area Si can be, for instance, 32% or lower, 30% or lower, 28% or lower, or even 25% or lower. The percent initial non-bonding area Si can be adjusted through, for instance, the structure (e.g. the ratio of indented pattern areas or coating layer areas in the entire adhesive face) of the adhesive face.

From the standpoint of suitably combining initial adhesion to adherend and anti-bubble properties against outgassing, the ratio of percent post-aging non-bonding area Sa to percent initial non-bonding area Si, that is, Sa/Si, is preferably 0.30 or higher. A higher Sa/Si value means a lower degree of shrinkage with aging for the non-bonding areas. From such a standpoint, in some embodiments, Sa/Si can be, for instance, 0.50 or higher, 0.60 or higher, 0.70 or higher, or even 0.75 or higher. Sa/S is generally below 1.00, typically 0.98 or lower.

The PSA sheet disclosed herein preferably has a post-aging peel strength F1 that is 0.60 times the initial peel strength F0 relative to a polycarbonate resin plate (PC plate). In other words, the peel strength retention rate F1/F0 defined as the ratio of post-aging peel strength F1 to initial peel strength F0 is preferably 0.60 or higher.

Here, the initial peel strength F0 used to determine the peel strength retention rate F1/F0 is obtained by measuring the 180° peel strength at a tensile speed of 300 mm/min at 30 minutes after the PSA sheet is applied to the PC plate. The post-aging peel strength F1 is obtained by measuring the 180° peel strength in the same manner as for the initial peel strength F0 after the PSA sheet is applied to the PC plate, stored in an environment at 85° C. and 85% RH for 24 hours and then in the standard environment at 23° C. and 50% RH for 30 minutes. More specifically, the initial peel strength F0 and post-aging peel strength F1 are determined by the method described later in Examples.

The PC plate with the PSA sheet applied thereto outgasses when stored in the hot and humid environment. The outgassed gas may accumulate between the PC plate and the PSA sheet to form bubbles, thereby decreasing the peel strength to the PC plate and degrading the bonding reliability. According to the PSA sheet disclosed herein, the outgassed gas can be suitably released to inhibit the outgassing bubble formation, thereby increasing the peel strength retention rate F1/F0. In other words, even when used in an embodiment where the adherend is likely to outgas, it can inhibit the decrease in peel strength to the adherend. The PSA sheet disclosed herein has a peel strength retention rate F1/F0 of preferably 0.70 or higher, or more preferably 0.75 or higher. In some embodiments, the peel strength retention rate F1/F0 can be, for instance, 0.78 or higher, 0.80 or higher, or even 0.83 or higher. The maximum F1/F0 is not particularly limited. It is usually 1.50 or lower, for instance, possibly 1.20 or lower.

The initial peel strength F0 is not particularly limited and can be, for instance, in the range between 1.0 N/20 mm and 15 N/20 mm. In some embodiments, the initial peel strength F) can be, for instance, 1.5 N/20 mm or greater, or even 2.0 N/20 mm or greater. The post-aging peel strength F1 is not particularly limited and can be, for instance, in the range between 1.0 N/20 mm and 15 N/20 mm. In some embodiments, the post-aging peel strength F1 can be, for instance, 1.5 N/20 mm or greater, or even 2.0 N/20 mm or greater. The PSA sheet according to a preferable embodiment may have a post-aging peel strength F1 of 1.5 N/20 mm or greater at a peel strength retention rate F1/F0 of 0.60 or higher. The PSA sheet according to a more preferable embodiment may have a post-aging peel strength F1 of 2.5 N/20 mm or greater at a peel strength retention rate F1/F0 of 0.70 or higher.

The PSA sheet disclosed herein is formed to have an ability to inhibit outgassing bubble formation as described above; and therefore, it can decrease the increase from the percent to-PC-plate initial non-bonding area S0 to the percent to-PC-plate post-aging non-bonding area S1. Here, the percent to-PC-plate initial non-bonding area S0 is determined in the same manner as for the percent initial non-bonding area Si, except that a PC plate is used as the adherend in place of the glass plate. The percent to-PC-plate post-aging non-bonding area S1 is determined in the same manner as for the percent post-aging non-bonding area Sa, except for the use of the PC plate as the adherend in place of the glass plate and the changes (85° C., 85% RH, 24 hours) in the aging test conditions. With advancing formation and growth of bubbles caused by outgassing from the PC plate, the ratio of areas non-bonding to the PC plate in the adhesive face decreases as compared to the initial ratio upon application to the PC plate. In other words, the outgassing bubble formation and growth tend to be better inhibited, resulting in a smaller value of S1–S0. Hereinafter, when S0 and S1 are both in percentage, the value of S1–S0 is referred to as the "increase in to-PC-plate non-bonding area percentage" as well. The art disclosed herein can provide a PSA sheet that shows up to 20% increase in to-PC-plate non-bonding area percentage. In the PSA sheet according to a preferable embodiment, the increase in to-PC-plate non-bonding area percentage can be, for instance, 15% or less, 10% or less, 5% or less, 3% or less, 0% or even less than 0%.

In a preferable embodiment, the adhesive fac of the PSA sheet may show a liner peel strength (i.e. peel strength to release liner) less than 1 N/50 mm. With respect to the PSA sheet having a liner peel strength below the prescribed value, the release liner can be easily removed, thereby facilitating the application work. With respect to the PSA sheet in an embodiment where the PSA layer has an indented pattern corresponding to the raised pattern of the release liner, it is also preferable to have not too high a liner peel strength from the standpoint of inhibiting deformation of the indented patterns when the release liner covering the adhesive face is being removed therefrom. As for the PSA sheet in an embodiment having a coating layer partially covering the PSA layer surface, it is also preferable to have not too high a liner peel strength from the standpoint of reducing wrinkling and displacement of the coating layer while the release liner covering the adhesive face is being removed therefrom. In some embodiments, the liner peel strength can be, for instance, 0.5 N/50 mm or less, or even 0.4 N/50 mm or less. In view of a possibility of degraded work efficiency when the liner peel strength is excessively low, the adhesive face of the PSA sheet preferably has a liner peel strength of about 0.01 N/50 mm or greater. The liner peel strength is determined based on JIS Z0237 at a tensile speed of 300 mm/min at a peel angle of 180° in an environment at 23° C. and 50% RH.

In a preferable embodiment, the PSA sheet is transparent (including semi-transparency). In such a PSA sheet, when bubbles and the like are present between the PSA sheet and the adherend (e.g. bubbles of air and the like trapped (left) during the application and bubbles outgassed after the application, etc.), these bubbles and the like are visible through the PSA sheet and are likely to degrade the appearance. The art disclosed herein prevents formation of the sort of bubbles between the PSA sheet and the adherend; and therefore, an excellent appearance can be obtained in a transparent PSA sheet. Here, that the PSA sheet is transparent means that the components (PSA layer, coating layer, etc.) of the PSA sheet are transparent. Here, that the PSA sheet and a component thereof are transparent may mean that the PSA sheet and a component thereof show a total light transmittance of 50% or higher, specifically 80% or higher (e.g. 90% or higher, typically 95% or higher). The PSA sheet preferably has a haze value of 10% or lower (e.g. 5% or lower). The total light transmittance and the haze value are determined based on JIS K7136-2000 using a commercial transmissometer (e.g. product name HAZE METER HIM-150 available from Murakami Color Research Laboratory). The total light transmittance and the haze value of the film substrate described later are also determined by the same methods.

The components of the PSA sheet may include the PSA layer, the coating layer in an embodiment having a coating layer and the substrate in an embodiment having a non-release substrate supporting the PSA layer (the substrate may serve as the release liner in a single-faced USA sheet). On the other hand, a release liner separate from the PSA sheet is excluded from the components of the PSA sheet because it is separated from the PSA sheet when the PSA sheet is applied to an adherend.

The total thickness of the PSA sheet disclosed herein is not particularly limited. From the standpoint of the handling properties, etc., the total thickness of the PSA sheet can be, for instance, about 2 μm or greater, 5 μm or greater, 10 μm or greater, or even 20 μm or greater. The total thickness of the PSA sheet can be, for instance, about 1000 μm or less, 500 μm or less, 300 μm or less, or even 100 μm or less. In a preferable embodiment, the total thickness of the PSA sheet can be, for instance, 70 μm or less, 50 μm or less, 40 μm or less, or even 35 μm or less. According to the art disclosed herein, although the PSA sheet has a limited total thickness as described above, the outgassing bubble formation can be suitably prevented and, preferably, good air release properties can be further shown at the time of application. As for the product to which the PSA sheet is applied, the PSA sheet with a limited total thickness may be advantageous in view of downsizing, weight saving, resource saving and so one.

The PSA sheet disclosed herein is preferably used (i.e. applied to an adherend) in an embodiment where the largest possible inscribed circle of the adhesive face of the PSA sheet has a diameter of about 3 cm or greater. With increasing diameter of the inscribed circle, bubble formation caused by outgassing of the adherend tends to be more likely. Thus, it is further significant to apply the art disclosed herein to inhibit the outgassing bubble formation. In some embodiments, the diameter of the inscribed circle can be, for instance, 5 cm or larger, 7 cm or larger, 10 cm or larger, or even 15 cm or larger. The maximum diameter of the inscribed circle is not particularly limited. The diameter of the inscribed circle can be, for instance, 40 cm or smaller, 30 cm or smaller, or even 20 cm or smaller. For example, when the adhesive face is rectangular in shape measuring 4 cm vertically and 5 cm horizontally, the inscribed circle has a diameter of 4 cm.

(Double-Faced PSA Sheet)

The first and second embodiments are described with examples of single-faced PSA sheets; however, the PSA sheet disclosed herein can also be suitably made as a double-faced PSA sheet, that is, a PSA sheet having an adhesive face on each side. The double-faced PSA sheet can be, for instance, a substrate-supported double-faced PSA sheet having the first and second PSA layers placed on the first and second faces of a substrate (film substrate), respectively; or a substrate-free double-faced PSA sheet formed of a PSA layer free of a substrate. In the substrate-supported double-faced PSA sheet, between the first adhesive face which is the first PSA layer-side surface and the second adhesive face which is the second PSA layer-side surface, at least one is preferably an adhesive face proofed against outgassing bubble formation. In the substrate-free double-faced PSA sheet, between the first adhesive face which is one face of the PSA layer and the second adhesive face which is the other face thereof (on the reverse side of the first adhesive face), at least one is preferably an adhesive face proofed against outgassing bubble formation. In particular, the adhesive face proofed against outgassing bubble formation may satisfy the percent post-aging non-bonding area Sa upon the treatment disclosed herein while being formed so that after the aging test, the non-bonding areas have linearly extending parts.

Figure 8:
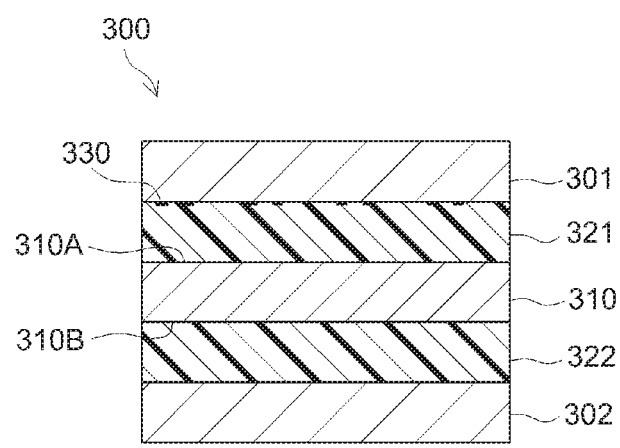
FIG. 8 shows a schematic cross-sectional diagram of the PSA sheet according to another embodiment.

FIG. 8 shows an example of the substrate-supported double-faced PSA sheet. A PSA sheet 300 may have a configuration where first and second faces 310A and 310B (both non-releasable) of a film substrate 310 have first and second PSA layers 321 and 322, respectively, with the PSA layers 321 and 322 protected respectively with release liners 301 and 302 each having a release face at least on the PSA layer side. In PSA sheet 300, only the surface of PSA layer 321 has partially a coating layer 330 similar to the second embodiment described above and the surface of PSA layer 322 has no coating layer; however, coating layers 330 may be provided partially to the respective surfaces of PSA layers 321 and 322. Similarly, in the substrate-free double-faced PSA sheet, the coating layer may be provided only to one fac of the PSA layer or to both the one and the other faces. While not shown in any particular drawing, the double-faced PSA sheet may have a configuration where the respective faces (both non-releasable) of a film substrate have PSA layers between which one is protected with a release liner having a release face on each side. By winding the PSA sheet to bring the other PSA layer in contact with the back face of the release liner, this type of PSA sheet can be made into an embodiment where the two PSA layers are protected with the one release liner.

Such a double-faced PSA sheet can be preferably used in bonding or fixing applications (or bonding applications, hereinafter). In such bonding applications, when a member to which the adhesive face is applied is formed of a likely outgassing material (e.g. polycarbonate resin) and the released gas accumulates between the adhesive face and the member's surface, as bubbles continue to form and grow due to the outgassing, the ratio of non-bonding areas between the member and the adhesive face (the percent non-bonding area) will gradually increase. Such an increase in percent non-bonding area may degrade the reliability of bonding between the members bonded together or fixed to each other via the double-faced PSA sheet. According to the double-faced PSA sheet disclosed herein, by applying the adhesive face proofed against outgassing bubble formation onto a likely outgassing member, the percent non-bonding area can be prevented from increasing. Besides for maintaining the bonding reliability, it is also beneficial to prevent the percent non-bonding area from increasing for stably maintaining the electric and thermal conductivity between the members bonded together or fixed to each other via the double-faced PSA sheet (i.e. in terms of inhibiting changes in these properties).

<Components of PSA Sheet>

(PSA Layer)

The PSA layer disclosed herein typically refers to a layer formed of a material (PSA) that exists as a soft solid (a viscoelastic material) in a room temperature range and has a property to adhere easily to adherend with some pressure applied. As defined in "*Adhesion: Fundamental and Practice*" by C. A. Dahlquist (McLaren & Sons (1966), P. 143), the PSA referred to herein can be generally a material that has a property satisfying complex tensile modulus $E^*$ (1 Hz)$<10^7$ dyne/cm$^2$ (typically, a material that exhibits the described characteristics at 25° C.).

The PSA layer disclosed herein may comprise, as its base polymer, one, two or more species among acrylic polymers, rubber-based polymers, polyester-based polymers, urethane-based polymers, polyether-based polymers, silicone-based polymers, polyamide-based polymers, fluorine-based polymers, etc. From the standpoint of the adhesive properties (e.g. peel strength, repulsion resistance), molecular design, etc., acrylic polymers can be preferably used. In other words, the PSA layer is preferably an acrylic PSA layer that comprises an acrylic polymer as its base polymer. The "base polymer" of a PSA refers to the primary component (typically, a component accounting for more than 50% by weight) among polymers in the PSA.

As the acrylic polymer, for example, a polymer of a monomeric starting material comprising an alkyl (meth) acrylate as a primary monomer and possibly comprising a secondary monomer copolymerizable with the primary monomer is preferable. The primary monomer here refers to a component that accounts for higher than 50% by weight of the monomer composition in the monomeric starting material.

As the alkyl (meth)acrylate, for instance, a compound represented by the following formula (1) can preferably be used:

$$CH_2=C(R^1)COOR^2 \quad (1)$$

Herein, $R^1$ in the formula (1) is a hydrogen atom or a methyl group. $R^2$ is a acyclic alkyl group having 1 to 20 carbon atoms (hereinafter, such a numerical range of carbon atoms may be indicated as "$C_{1-20}$"). From the standpoint of the storage elastic modulus of the PSA, etc., an alkyl (meth)acrylate having a $C_{1-12}$ (e.g. $C_{2-10}$, typically $C_{4-8}$) acyclic alkyl group for $R^2$ is preferable. For the alkyl (meth)acrylate having a $C_{1-20}$ acyclic alkyl group for $R^2$, solely one species or a combination of two or more species can be used. Preferable alkyl (meth)acrylates include n-butyl acrylate and 2-ethylhexyl acrylate.

The secondary monomer copolymerizable with the alkyl (meth)acrylate as the primary monomer may be useful in introducing crosslinking points into the acrylic polymer and increasing the cohesive strength of the acrylic polymer. By selecting the species of secondary monomer and its amount used, the PSA's fluidity with aging can be adjusted and the percent post-aging non-bonding area Sa as well as the non-bonding retention rate Sa/Si can be controlled.

the secondary monomer, one, two or more species can be used among functional group-containing monomers such as carboxy group-containing monomers, hydroxy group-containing monomers, acid anhydride group-containing monomers, amide group-containing monomers, amino group-containing monomers, and monomers having nitrogen-containing rings. The secondary monomer may also be a vinyl ester-based monomer such as vinyl acetate, an aromatic vinyl compound such as styrene, a sulfonate group-containing monomer, a phosphate group-containing monomer, etc. For instance, from the standpoint of increasing the cohesive strength, an acrylic polymer in which a carboxy group-containing monomer or a hydroxy group-containing monomer is copolymerized as the secondary monomer is preferable. Preferable examples of the carboxy group-containing monomer include acrylic acid and methacrylic acid. Preferable examples of the hydroxy group-containing monomer include hydroxyalkyl (meth)acrylates such as 2-hydroxyethyl acrylate and 4-hydroxybutyl acrylate. Suitable examples of the secondary monomer useful in adjusting the PSA's fluidity with aging include carboxy group-containing monomers, hydroxy group-containing monomers and vinyl ester-based monomers.

The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less, for instance, 5% by weight or less. When a carboxy group-containing monomer is copolymerized in the acrylic polymer, from the standpoint of combining adhesive strength and cohesive strength, the carboxy group-containing monomer content is preferably about 0.1% by weight or greater, possibly 0.2% by weight or greater, or even 0.5% by weight or greater); it is preferably about 10% by weight or less, possibly 8% by weight or less, or even 5% by weight or less. When a hydroxy group-containing monomer is copolymerized in the acrylic polymer, from the standpoint of combining adhesive strength and cohesive strength, the hydroxy group-containing monomer content is in a range of preferably about 0.001% by weight or greater, possibly 0.01% by weight or greater, or even 0.02% by weight or greater; it is preferably about 10% by weight or less, possibly 5% by weight or less, or even 2% by weight or less. When a vinyl ester-based monomer such as vinyl acetate is copolymerized as the secondary monomer, the vinyl ester based monomer content is preferably about 30% by weight or less of all the monomers used in synthesizing the acrylic polymer; it can be, for instance, 10% by weight or less, or even 7% by weight or less; it is preferably about 0.01% by weight or greater, possibly 0.1% by weight or greater, 1% by weight or greater, or even 3% by weight or greater.

The method for obtaining the acrylic polymer is not particularly limited. Various polymerization methods known as procedures for the synthesis of acrylic polymer can be suitably employed, such as solution polymerization, emulsion polymerization, bulk polymerization and suspension polymerization. It is also possible to employ active energy ray radiation polymerization which involves irradiation of UV, etc. For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator.

From the standpoint of combining adhesive strength and cohesive strength in a well-balanced way, the acrylic polymer (suitably an acrylic polymer) has a weight average molecular weight (Mw) of preferably $10\times10^4$ or higher, more preferably $20\times10^4$ or higher (e.g. $30\times10^4$ or higher); it is preferably $100\times10^4$ or lower, more preferably $80\times10^4$ or lower (e.g. $60\times10^4$ or lower). In this description, Mw refers to the value based on standard polystyrene obtained by GPC (gas permeation chromatography).

The glass transition temperature (Tg) of the base polymer (suitably an acrylic polymer) is not particularly limited. The base polymer's Tg is usually preferably in the range between about −80° C. and −10° C., or possibly in the range between −70° C. and −20° C. With increasing Tg, the flowing of PSA with aging tends to be inhibited with a higher non-bonding area retention rate Sa/Si. From such a standpoint, in some embodiment, the base polymer can have a Tg of for instance, −63° C. or higher, −58° C. or higher, or even −53° C. or higher. From the standpoint of the ease of application to adherend, etc., in some embodiments, the base polymer can have a Tg of, for instance, −30° C. or lower, −40° C. or lower, or even −45° C. or lower.

Here, the Tg of the base polymer refers to the value determined by the Fox equation based on the Tg values of homopolymers of the monomers forming the polymer and the weight fractions (copolymerization ratio by weight) of the monomers. As shown below, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation. Tg represents the glass transition temperature (unit: K) of the copolymer. Wi the weight fraction (Copolymerization ratio by weight) of a monomer i in the copolymer, and Tgi the glass transition temperature (unit: K) of homopolymer of the monomer i. As for the Tg values of homopolymers, values found in known documents are used.

In the art disclosed herein, as the Tg values of the homopolymers, the following values are used in particular:

| | |
|---|---|
| 2-ethylhexyl acrylate | −70° C. |
| n-butyl acrylate | −55° C. |
| vinyl acetate | 32° C. |
| acrylic acid | 106° C. |
| 2-hydroxyethyl acrylate | −15° C. |
| 4-hydroxybutyl acrylate | −40° C. |

With respect to the Tg value of a homopolymer other than those listed above, the value given in "Polymer Handbook" (3rd edition, John Wiley & Sons, Inc., Year 1989) is used. When several values are found in "Polymer Handbook, the conventional value is used, certain monomer, the highest value is used. With respect to a monomer not found in "Polymer Handbook," the catalog value provided by the monomer's manufacturer is used. As for the Tg value of homopolymer of a monomer for which no value is given in "Polymer Handbook" or in the catalog provided by the monomer's manufacturer, the value obtained by the measurement method described in Japanese Patent Application Publication No. 2007-51271 is used.

In the PSA layer disclosed herein, a crosslinking agent may be used as necessary. The crosslinking agent may be useful in adjusting (typically decreasing) the fluidity of PSA with aging. Examples of the crosslinking agent include known epoxy-based crosslinking agents, isocyanate-based crosslinking agents, silicone-based crosslinking agents, oxazoline-based crosslinking agents, aziridine-based crosslinking agents, silane-based crosslinking agents, alkyl-etherified melamine-based crosslinking agents and metal chelate-based crosslinking agents.

Specific examples of the isocyanate crosslinking agent include tolylene diisocyanate, hexamethylene diisocyanate, isophorone diisocyanate, xylylene diisocyanate, hydrogenated xylylene diisocyanate, diphenyl(meth)ane diisocyanate, hydrogenated diphenyl(meth)ane diisocyanate, tetramethylxylylene diisocyanate, naphthalene diisocyanate, triphenyl(meth)ane triisocyanate, polymethylene polyphenyl isocyanate and adducts of the foregoing with a polyol such as trimethylolpropane. Alternatively, as the isocyanate crosslinking agent, it is possible to use a compound having at least one isocyanato group and one or more unsaturated bonds per molecule, namely, 2-isocyanatoethyl (meth)acrylate and the like. Among these, solely one species or a combination of two or more species can be used.

Examples of the epoxy crosslinking agent include bisphenol A, epichlorohydrin-based epoxy resins, ethylene glycidyl ether, polyethylene glycol diglycidyl ether, glycerine diglycidyl ether, glycerine triglycidyl ether, 1,6-hexanediol glycidyl ether, trimethylolpropane triglycidyl ether, diglycidyl aniline, diamine glycidyl amine, N,N,N',N'-tetraglycidyl-m-xylylene diamine and 1,3-bis(N,N-diglycidylaminomethyl)cyclohexane. Among these, solely one species or a combination of two or more species can be used.

These crosslinking agents can be used singly as one species or in a combination of two or more species. As the crosslinking agent in the art disclosed herein, isocyanate-based crosslinking agents, epoxy-based crosslinking agents and isocyanate-based crosslinking agents are particularly preferable. The art disclosed herein can be preferably implemented in an embodiment using at least an isocyanate-based crosslinking agent as the crosslinking agent.

To 100 parts by weight of the base polymer, the crosslinking agent can be used in an amount of, for instance, 0.01 part by weight or greater, 0.05 part by weight or greater, 0.10 part by weight or greater, or even 0.50 part by weight or greater. With increasing amount of crosslinking agent used, the PSA tends to become less fluid to show a higher non-bonding area retention rate Sa/Si. From such a standpoint, the amount of crosslinking agent used to 100 parts by weight of base polymer can be, for instance, 0.70 part by weight or greater, 1.0 part by weight or greater, or even 2.0 parts by weight or greater. From the standpoint of better reducing the PSA's fluidity in some embodiments, the amount of crosslinking agent used can be, for instance, above 2.5 parts by weight, above 3.0 parts by weigh, above 3.5 parts by weight, above 4.5 parts by weight, above 5.0 parts by weight, above 5.5 parts by weight, or even above 6.5 parts by weight. From the standpoint of the ease of applying the PSA sheet, etc., the amount of crosslinking agent used to 100 parts by weight of base polymer is usually suitably 20 parts by weight or less, 15 parts by weight or less, or even 10 parts by weight or less.

The PSA layer disclosed herein may have a composition comprising a tackifier resin. The tackifier resin is not particularly limited. Various tackifier resins can be used, such as rosin-based tackifier resin, terpene-based tackifier resin, hydrocarbon-based tackifier resin, epoxy-based tackifier resin, polyamide-based tackifier resin, elastomer-based tackifier resin, phenolic tackifier resin, and ketone-based tackifier resin. These tackifier resins can be used solely as one species or in a combination of two or more species.

Specific examples of the rosin-based tackifier resin include unmodified rosins (raw rosins) such as gum rosin, wood rosin, and tall-oil rosin; and modified rosins obtainable from these unmodified rosins via modifications such as hydrogenation, disproportionation, and polymerization (hydrogenated rosins, disproportionated rosins, polymerized rosins, other chemically-modified rosins, etc.); and various other rosin derivatives. E Examples of the rosin derivatives include rosin esters such as rosin esters obtainable by esterifying unmodified rosins with alcohols (i.e. esterified rosins) and modified rosin esters obtainable by esterifying modified rosins with alcohols (i.e. esterified modified rosins, e.g. esters of polymerized rosins); the same applies hereinafter); unsaturated fatty acid-modified rosins obtainable by modifying unmodified rosins or modified rosins with unsaturated fatty acids; unsaturated fatty acid-modified rosin esters obtainable by modifying rosin esters with unsaturated fatty acids; rosin alcohols obtainable by reduction of carboxy groups in unmodified rosins, modified rosins, unsaturated fatty acid-modified rosins, or unsaturated fatty acid-modified rosin esters; metal salts of rosins such as unmodified rosins, modified rosins and various rosin derivatives (especially rosin esters); and rosin phenol resins obtainable by subjecting rosins (hydrogenated rosins, disproportionated rosins, polymerized rosins, etc.) to acid-catalyzed phenol addition followed by thermal polymerization. When using an acrylic polymer as the base polymer, a rosin-based tackifier resin is preferably used. In some embodiments, from the standpoint of improving the adhesive properties such as adhesive strength, among these rosin-based tackifier resins, two, three or more different species varying in properties (e.g. softening point) can be used together.

Examples of the terpene-based tackifier resin include terpene resins such as α-pinene polymers, β-pinene polymers and dipentene polymers; and modified terpene resins obtainable by subjecting these terpene resins to modifications (phenol modification, aromatic modification, hydrogenation, hydrocarbon modification, etc.). Examples of the modified terpene resin include terpene phenol resins, aromatic modified terpene resins and hydrogenated terpene resins. When using an acrylic polymer as the base polymer, as the terpene-based tackifier resin, for instance, a terpene phenol resin can be preferably used. A terpene-based tackifier resin and other tackifier resin(s) (e.g. a rosin-based tackifier resin) can be used together.

Examples of the hydrocarbon-based tackifier resin include various hydrocarbon resins such as aliphatic hydrocarbon resins, aromatic hydrocarbon resins, aliphatic cyclic hydrocarbon resins, aliphatic/aromatic petroleum resins (styrene-olefin copolymers and the like), aliphatic/alicyclic petroleum resins, hydrogenated hydrocarbon resin, coumarone resins, and coumarone indene resins.

From the standpoint of inhibiting the PSA from flowing with aging, the tackifier resin has a softening point (temperature of softening) of preferably about 80° C. or higher, or more preferably 100° C. or higher. The maximum softening point of the tackifier resin is not particularly limited; it can be, for instance, 180° C. or lower, about 160° C. or lower, or even about 140° C. or lower. The softening point of tackifier resin referred to herein is defined as the value measured by the softening point test method (ring and ball method) specified either in JIS K5902:2006 or in JIS K2207:2006.

When a tackifier resin is used, its amount used is not particularly limited and can be suitably selected in accordance with the purpose. For instance, by solid content, the tackifier resin can be used in an amount of about 10 parts by weight or greater, about 20 parts by weight or greater, or even about 25 parts by weight or greater, relative to 100 parts by weight of the base polymer (suitably an acrylic polymer). By solid content, the tackifier resin can be used in an amount of about 100 parts by weight or less, 80 parts by weight or less, or even about 60 parts by weight or less, relative to 100 parts by weight of the base polymer.

The PSA composition may comprise, as necessary; various additives generally known in the field of PSA compositions, such as leveling agent, crosslinking accelerator, plasticizer, softening agent, filler, anti-static agent, anti-aging agent, UV-absorbing agent, antioxidant and photostabilizing agent. With respect to these various additives, heretofore known species can be used by typical methods.

The PSA layer disclosed herein may be formed from aqueous, solvent-based, hot-melt, and active energy ray-curable types of PSA composition, etc. Here, the aqueous PSA composition refers to a PSA composition in a form comprising PSA (PSA layer-forming components) in a solvent whose primary component is water (in an aqueous solvent), typically including a so-called water-dispersed PSA composition (a composition in a form where at least part of the PSA is dispersed in water). The solvent-based PSA composition refers to a PSA composition in a form comprising PSA in an organic solvent. From the standpoint of reducing environmental stress, an aqueous PSA composition is preferable. From the standpoint of the adhesive properties, etc., a solvent-based PSA composition is preferably used.

The PSA sheet disclosed herein can be formed by a heretofore known method. For instance, when the PSA sheet is in an embodiment having a substrate (support substrate, e.g. a film substrate as described later) supporting the PSA layer, a transfer method can be preferably used, in which a PSA composition is provided to a releasable surface (a release face) and allowed to dry to form a PSA layer on the surface and the PSA layer is transferred to a substrate. Alternatively, a direct method can also be employed, in which a PSA composition is directly provided (typically applied) to a substrate and allowed to dry to form a PSA layer. As the release face, a release liner surface, the back face of a substrate treated with a release agent, and the like can be used.

The PSA composition can be applied using a known or commonly used mater, such as a gravure roll coater, reverse roll coater, kiss roll coater, comma coater, dip roll coater, die coater, bar coater, knife oater, and spray coater. Alternatively, the PSA composition can be applied by immersion, curtain coating, etc. From the standpoint of facilitating the crosslinking reaction, increasing the productivity, etc., the PSA composition is preferably heated to dry. The drying temperature can be, for instance, about 40° C. to 150° C., or usually preferably about 60° C. to 130° C. After dried, the PSA composition can be further allowed to age for adjustment of migration of the components in the PSA layer, for the progress of the crosslinking reaction, for releasing the distortion possibly present in the substrate and PSA layer, etc.

The thickness of the PSA layer is not particularly limited; it can be suitably selected in accordance with the purpose. The thickness of the PSA layer can be, for instance, 200 μm or less, 100 μm or less, 80 μm or less, 60 μm or less, 40 μm or less, 30 μm or less, or even 25 μm or less. It may be advantageous to limit the thickness of the PSA layer in view of making the PSA sheet thinner, smaller, lighter, resource-saving, and so on. In some embodiments, from the standpoint of inhibiting the PSA layer from flowing and increasing the non-bonding area retention rate Sa/Si, the thickness of the PSA layer can be, for instance, 20 μm or less, 15 μm or less, less than 10 μm, less than 7 μm, or even less than 5 μm. With decreasing thickness of the PSA layer, the flowing of the PSA layer tends to be inhibited while the PSA sheet is on the adherend. From the standpoint of the efficiency of application to adherend and the ease of manufacturing, the thickness of the PSA layer is usually suitably about 0.5 μm or greater. The thickness of the PSA layer can be, for instance, 1 μm or greater, 2 μm or greater, 3 μm or greater, 5 μm or greater, or even 7 μm or greater. When the art disclosed herein is implemented in an embodiment of an adhesively double-faced sheet having a PSA layer on each face of a substrate, the thicknesses of the respective PSA layers can be the same or different.

(Coating Layer)

In an embodiment having a coating layer partially covering the PSA layer surface, the coating layer is not particularly limited as long as the coating layer can form—along itself in the adhesive face—areas (non-bonding areas) that are not in tight contact with the adherend. A favorable example of the coating layer-forming material is a resin material. From the standpoint of the appearance, the coating layer is preferably formed from a transparent or semi-transparent resin material.

Examples of the resin material form which the coating layer can be formed include a polyurethane-based resin, a phenolic resin, an epoxy-based resin, a polyamide-based resin, a urea melamine-based resin, a silicone-based resin, a polysilazane-based resin, a fluororesin, a phenoxy resin, a methacrylic resin, an acrylic resin, an acrylic urethane-based resin, an acrylic styrene-based resin, a polyarylate resin, a polyester-based resin, a polyolefinic resin, a polystyrene-based resin, polyvinyl chloride, a vinyl chloride/vinyl acetate copolymer, polyvinyl acetate, polyvinylidene chloride, polycarbonate, a cellulose, and a polyacetal. The resin can be one, two or more species of resin selected from various types of resins including a heat-curable resin, a UV-curable resin, an electron beam-curable resin, and a two-component resin that is curable upon mixing.

The coating layer disclosed herein may comprise as necessary various additives such as fillers, anti-aging agent, antioxidant, UV absorber, crosslinking agent, slip agent, colorant (pigment, dye, etc.), antistatic agent, viscosity-adjusting agent (thixotropic agent, thickening agent, etc.), and film-forming aid.

The coating layer is typically non-adhesive or weakly adhesive. By this, in areas having the mating layer, the adhesive face can be suitably inhibited from bonding to the adherend. Here, that the mating layer is non-adhesive or weakly adhesive means that the coating layer has a 180° peel strength less than 3 N/25 mm (typically less than 1 N/25 mm, including unmeasurably low adhesive strength). In particular, the 180° peel strength of the coating layer is determined by the following method: The PSA sheet having a mating layer over the entire PSA layer surface is cut to a 25 mm wide by 100 mm long size to obtain a measurement sample; in an environment at 23° C., 50% RH, the measurement sample is press-bonded over its mating layer surface to the surface of a stainless steel plate (SUS304BA plate) with a 2 kg roller moved back and forth once. If it does not adhere, it is considered non-adhesive here. The resultant is left standing in the same environment for 30 minutes. Using a universal tensile/compression tester, based on JIS Z 0237:2000, it is then measured for peel strength (N/25 mm) at a tensile speed of 300 mm/min at a peel angle of 180°.

In a typical embodiment, the coating layer surface may have an arithmetic average roughness of 0.1 µm or greater. In such an embodiment, when the adhesive face of the PSA sheet is adhered to an adherend, the surface structure of the coating layer creates voids at the interface with the adherend, facilitating the gas flow at the interface between the coating layer surface and the adherend. This can better prevent the outgassing bubble formation. The facilitated gas flow at the interface between the coating layer surface and the adherend may advantageously contribute to enhancing the air release properties when the PSA sheet is being applied to the adherend. The arithmetic average roughness of the coating layer surface is preferably 0.2 µm or greater, for instance, greater than 1.0 µm. The maximum arithmetic average roughness of the coating layer surface is not particularly limited. It is usually suitably about 5.0 µm or less.

The method for placing the coating layer on the PSA layer surface is not particularly limited. In typical, a method as described next is employed. In particular, a coating layer-forming composition is prepared as necessary by dissolution or dispersion in a suitable solvent. Subsequently, by employing a suitable method among various known or commonly-used printing methods, the composition is provided to a release face of a releasable support (or a coating layer transferring film, typically a release liner) and allowed to cure. The releasable support surface on which the coating layer is formed is brought into contact with the PSA layer surface to transfer the coating layer onto the PSA layer surface. The coating layer is thus partially placed on the PSA layer surface. For instance, a desirable coating layer pattern such as a lattice pattern can be preferably formed by employing a method such as offset printing, silk screen printing, letterpress printing, flexographic printing, gravure printing, and inkjet printing. From the standpoint of the air release properties, gravure printing is more preferable. Alternatively, the same embodiment can also be obtained by forming a coating layer on a release face as described above and further forming a PSA layer to cover the coating layer. In case of a substrate-supported PSA sheet, the resulting PSA layer is subsequently transferred onto the surface of a film substrate. Based on technical common knowledge in the pertinent field, a skilled person can employ a method as described above, select a coating layer material in view of the wetting properties relative to the release face of the releasable support, adjust the viscosity of the coating layer-forming composition to a suitable range, and further select, for instance, a suitable printing means to form a coating layer disclosed herein.

(Substrate)

The PSA sheet disclosed herein may include a substrate supporting (backing) the PSA layer. The PSA sheet in such an embodiment can be thought as a substrate-supported ISA sheet having a PSA layer on at least one face of the substrate (support substrate). The PSA layer-side surface of the substrate is non-releasable. In the PSA sheet in an embodiment where the PSA layer is placed only on one face of the substrate, the second face of the substrate can be releasable or non-releasable. The material of the substrate is not particularly limited and can be suitably selected in accordance with the purpose and application of the PSA sheet. Non-limiting examples of the substrate that may be used include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, Kraft paper and crepe paper; and metal foil such as aluminum foil and copper foil. The substrate may be a composite of these materials. Examples of the composite substrate include a substrate having a layered structure of metal foil and plastic film, and a plastic substrate reinforced with inorganic fibers such as glass cloth.

As the substrate of the PSA sheet disclosed herein, various kinds of film substrates can be preferably used. As the film substrate, it is possible to use, for instance, resin film, paper, cloth, rubber film, foam film, and metal foil as well as a composite and a laminate of these. In particular, from the standpoint of the ease of application and the appearance, a preferable film substrate comprises a resin film layer. The inclusion of the resin film layer is advantageous also from the standpoint of the size stability, the accuracy of thickness, the ease of processing, the tensile strength and so on. Examples of the resin film include polyolefinic resin film such as PE, PP, and ethylene/polypropylene copolymers; polyester-based resin film such as PET, polybutylene terephthalate, and polyethylene naphthalate; vinyl chloride-based resin film; vinyl acetate-based resin film; polyimide-based resin film; polyamide-based resin film; fluororesin film; and cellophane. Favorable examples include resin films formed from PE, PP and PET. Among the resin films, polyester film is more preferable; among them, PET film is even more preferable. The film substrate may have a mono-layer structure or a multilayer structure formed of two, three or more layers.

In a preferable embodiment, the film substrate is a substrate comprising a foam film (a foam-containing substrate). This provides impact-absorbing capabilities to the PSA sheet. Here, the foam film refers to a film structure having a part with pores (a pore structure). The foam-containing substrate may be a mono-layer structure formed from a foam film or a multi-layer structure wherein at least one of whose two or more layers is formed of a foam film (a foam layer). A configurational example of the foam-containing substrate is a composite substrate in which a foam film (a foam layer) and a non-foamed film (a non-foamed layer) are laminated. The non-foamed film (non-foamed layer) refers to a film structure that has not been subjected to a purposeful foaming process (e.g. a process to incorporate pores), referring to a film essentially free of a pore structure. A typical example of the foam film is a resin film (e.g. a polyester-based resin film such as of PET) having an expansion rate of less than 1.1-fold (e.g. less than 1.05-fold, typically less than 1.01-fold). When the film substrate comprises two or more foam layers, the materials and structures of these foam layers can be identical or different. When the foam film has a multi-layer structure that includes a foam layer, from the standpoint of increasing the tightness between layers, adhesive layers may be placed between the layers.

The foam film is not particularly limited in average pore diameter; it is usually suitably 10 µm or greater, preferably 20 µm or greater, or more preferably 30 µm or greater. When the average pore diameter is 10 µm or greater, the impact absorbing properties tend to increase. The average pore diameter is usually suitably 200 µm or less, preferably 180 µm or less, or more preferably 150 µm or less. When the average pore diameter is 200 µm or smaller, the handling properties and waterproof properties (water blocking properties) tend to increase. The average pore diameter (µm) of the foam film can be determined, using a low-vacuum scanning electron microscope to take an enlarged image of a cross section of the foam and subjecting it to image analysis. About 10 to 20 pores can be analyzed. As the low-vacuum scanning electron microscope, for instance, product name S-3400N Scanning Electron Microscope available from Hitachi High-Tech Science Systems Corporation) can be used.

The foam film is not particularly limited in density (apparent density); it is usually suitably 0.01 g/cm$^3$ or higher, preferably 0.01 g/cm$^3$ or higher, or more preferably 0.02 g/cm$^3$ or higher. When the density is 0.01 g/cm$^3$ or higher, the strength of the foam film (and even that of the PSA sheet) will increase with a tendency toward greater impact resistance and handling properties. The density is preferably 0.7 g/cm$^3$ or lower, or more preferably 0.5 g/cm$^3$ or lower. When the density is 0.7 g/cm$^3$ or lower, the conformability to a difference in level tends to increase without an excessive decrease in flexibility. The density (apparent density) of the foam film is determined based on the method described in JIS K 7222:1999. In particular, the foam film is punched out into a 100 mm by 100 mm size to prepare a specimen and the dimensions of the specimen are measured. Using a 1/100 dial gauge with a 20 mm diameter measurement terminal, the thickness of the specimen is measured. From these values, the volume of the foam film specimen is determined. The specimen is weighed on a top-loading balance (minimum scale 0.01 g or greater). From these values, the apparent density (g-cm$^3$) of the foam film can be determined.

The 50% compressive stress of the foam film is not particularly limited. From the standpoint of the impact resistance, the foam film suitably shows a 50% compressive stress of 0.1 N/cm$^2$ or greater. When the 50% compressive stress is at or above a certain value, for instance, even if the foam film is thin (e.g. about 100 µm thick), it can show sufficient resistance when compressed (resilience to compression) and maintain good impact resistance. The 50% compressive stress is preferably 0.2 N/cm$^2$ or greater, or more preferably 0.5 N/cm$^2$ or greater. From the standpoint of combining flexibility and impact resistance in a well-balanced way, the 50% compressive stress is suitably 8 N/cm$^2$ or less, preferably 6 N/cm$^2$ or less, or more preferably 3 N/cm$^2$ or less. The 50% compressive stress (hardness) of the foam film is determined based on JIS K 6767:1999. In particular, the foam film is cut to 100 mm by 100 mm pieces. These pieces are layered to a total thickness of at least 2 mm and the resultant is used as a measurement sample. At room temperature, using a compression tester, the measurement sample is compressed at a rate of 10 mm/min. When compressed to 50% (when compressed to 50% of its initial thickness) and held at 50% compression for 10 seconds, the value (resilience in N/cm$^2$) is recorded as the 50% compressive stress. Other conditions (e.g. jig and calculation method, etc.) are conformed to JIS K 6767:1999.

The foam constituting the foam film disclosed herein is not particularly limited in pore structure. The pore structure can be a continuous pore structure, an isolated pore structure, or a semi-continuous pore structure. From the standpoint of the impact absorbing properties, continuous and semi-continuous pore structures are preferable.

The material of the foam film is not particularly limited. The foam film can be typically formed from a material comprising a polymer component (e.g. a thermoplastic polymer). A preferable foam film is usually formed of foam of a plastic material (plastic foam). The plastic material (which means to include a rubber material) for forming the plastic foam is not particularly limited; a suitable species can be selected among known plastic materials. For the plastic material (typically a thermoplastic polymer), solely one species or a combination of two or more species can be used. The primary component (typically a component accounting for more than 50% by weight) among the polymers in the film substrate or the foam film may be referred to as the "base polymer" hereinafter.

Specific examples of the foam include polyolefinic resin foam such as PE foam and PP foam; polyester-based foam such as PET foam, polyethylene naphthalate foam and polybutylene terephthalate foam; polyvinyl chloride-based resin foam such as polyvinyl chloride foam; vinyl acetate-based foam; acrylic resin foam; polyphenylene sulfide resin foam; amide-based resin foam such as polyamide (nylon) resin foam and all-aromatic polyamide (aramide) resin foam; polyimide-based resin foam; polyether ether ketone (PEEK) foam; styrene-based resin foam such as polystyrene foam; and urethane-based resin foam such as polyurethane resin foam. As the foam, rubber-based resin foam such as polychloroprene rubber foam can be used as well.

In a preferable embodiment, acrylic resin foam (foam formed from acrylic resin) is used as the foam. Here, the acrylic resin foam refers to foam comprising an acrylic polymer as the base polymer. The acrylic polymer in this description is as defined earlier. As the alkyl (meth)acrylate forming the acrylic polymer, one, two or more species can be preferably used among alkyl (meth)acrylates having acyclic alkyl groups with 1 to 20 (preferably 1 to 8, typically 1 to 4) carbon atoms. Preferable examples of the alkyl (meth)acrylate include ethyl acrylate, n-butyl acrylate and 2-ethylhexyl acrylate. The amount of the alkyl (meth)acrylate as the primary monomer is suitably 70% by weight or more of all monomers in the acrylic polymer, or preferably 75% by weight or more (e.g. 80% by weight or more). The amount of the alkyl (meth)acrylate is suitably 98% by weight or less of all the monomers, or preferably 97% by weight or less (e.g. 96% by weight or less).

The secondary monomer co-polymerizable with the alkyl (meth)acrylate as the primary monomer may be useful in introducing crosslinking points in the acrylic polymer or in increasing the cohesive strength of the acrylic polymer. As the secondary monomer, one, two or more species of functional group-containing monomers can be used among, for instance, carboxy group-containing monomers, hydroxy group-containing monomers, acid anhydride group-containing monomers, amide group-containing monomers, amino group-containing monomers, cyano group-containing monomers, monomers having nitrogen atom-containing rings and the like. The secondary monomer can also be a vinyl ester-based monomer such as vinyl acetate, an aromatic vinyl compound such as styrene, a sulfonate group-containing monomer, a phosphate group-containing monomer and the like. The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less.

When the foam is formed with an emulsion-based resin composition by a foaming method where gases including air are mixed in mechanically such as by stirring, it is preferable that the monomers forming the acrylic polymer comprise a nitrogen atom-containing monomer as the secondary monomer. This facilitates the formation of pores in the foaming process and may increase the viscosity of the composition when forming the foam (typically when drying the resin composition), whereby the pores are readily kept in the foam body.

Examples of the nitrogen atom-containing monomer include cyano group-containing monomers such as acrylonitrile and methacrylonitrile; lactam ring-containing monomers such as N-vinyl-2-pyrolidone; amide group-containing monomers such as (meth)acrylamide, N-hydroxyethyl (meth)acrylamide, N-methylolacrylamide, N,N-dimethylacrylamide, N,N-diethylacrylamide and diacetone acrylamide. These can be used solely as one species or in a combination of two or more species. Among them, cyano group-containing monomers such as acrylonitrile and lactam ring-containing monomers such as N-vinyl-2-pyrolidone are preferable.

The amount of the nitrogen atom-containing monomer is suitably 2% by weight or more of all monomers in the acrylic polymer, or preferably 3% by weight or more (e.g. 4% by weight or more). The amount of the nitrogen atom-containing monomer is suitably 30% by weight or less of all the monomers, or preferably 25% by weight or less (e.g. 20% by weight or less).

The method for obtaining the acrylic polymer is not particularly limited. Various polymerization methods known as procedures for the synthesis of acrylic polymer can be suitably used, such as solution polymerization, emulsion polymerization, bulk polymerization, suspension polymerization, active energy ray polymerization (e.g. UV polymerization). For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator. In view of the ease of foaming and environmental aspects, it is preferable to use acrylic resin foam (emulsion-based acrylic resin foam) obtained by emulsion polymerization.

From the standpoint of increasing the cohesive strength, the acrylic resin foam-forming composition preferably comprises a crosslinking agent. The type of crosslinking agent is not particularly limited. Among various crosslinking agents, one, two or more species can be suitably selected and used. Favorable examples of the crosslinking agent include isocyanate-based crosslinking agents, epoxy-based crosslinking agents, oxazoline-based crosslinking agents, carbodiimide-based crosslinking agents, melamine-based crosslinking agents and metal oxide-based crosslinking agents. In particular, oxazoline-based crosslinking agents are preferable. The amount of the crosslinking agent used is not particularly limited. To 100 parts by weight of the acrylic polymer, it is suitably about 10 parts by weight or less (preferably about 5 parts by weight or less); it can be 0.005 par by weight or greater (preferably about 0.01 part by weight or greater).

In another preferable embodiment, polyolefinic resin foam (resin foam formed from a polyolefin) is used as the foam. As the plastic material forming the polyolefinic foam, various known or commonly-used polyolefinic resins can be used without particular limitations. Examples include polyethylene such as low density polyethylene (LDPE), linear low density polyethylene (LLDPE), high density polyethylene (HDPE) and metallocene catalyst-based linear low density polyethylene; polypropylene; ethylene-propylene copolymer; and ethylene-vinyl acetate copolymer. Among these polyolefinic resins, solely one species or a combination of two or more species can be used.

From the standpoint of the impact resistance, waterproof properties, etc., favorable examples of the foam film in the art disclosed herein include a polyethylene-based foam film essentially formed of polyethylene-based resin foam and a polypropylene-based foam film essentially formed of polypropylene-based resin foam. Here, the polyethylene-based resin refers to resin formed from ethylene as the primary monomer (i.e. the primary component among the monomers) and may include HDPE, LDPE and LLDPE as well as ethylene-propylene and ethylene-vinyl acetate copolymers of which ethylene is copolymerized at a ratio above 50% by weight. Similarly, the polypropylene-based resin refers to resin formed from propylene as the primary monomer. As the foam film in the art disclosed herein, a polypropylene-based foam film can be preferably used.

The foaming method for the foam film is not particularly limited. In accordance with the purpose, ease of procedures, etc., chemical procedures, physical procedures and so on can be employed individually or in combination. From the standpoint of the contamination, etc., physical foaming methods are preferable. Specific examples include a foaming method where a film-forming material is prepared to contain a foaming agent such as a low boiling compound (e.g. a hydrocarbon) and thermally expandable microspheres and pores are formed from the foaming agent, a foaming method where gases such as air are mechanically mixed in, a foaming method by solvent removal which takes advantage of removal of a solvent such as water, and a foaming method using a supercritical fluid. For instance, a method where an inert gas (e.g. carbon dioxide) is injected into the foam film-forming polymer under increased pressure and the resultant is placed under reduced pressure to form a foam film. By this method, the average pore diameter can be easily controlled to be at or below a certain value and the foam film can be easily made to have a lower density.

The foam film is fabricated by employing a foaming method as described above. The formation of the foam film is not particularly limited. For instance, when employing a foaming method that mechanically admixes gases such as air, a resin composition (e.g. an emulsion-based resin composition) containing foam can be subsequently applied over a substrate or release paper, etc., and allowed to dry to obtain a foam film. From the standpoint of the foam stability, etc., the drying preferably includes a preliminary drying step at or above 50° C., but below 125° C. as well as a main drying step at 125° C. to 200° C. Alternatively, foam can be formed continuously into a film using a calender, extruder, conveyer belt casting and so forth; or a method where a kneaded mixture of fam-forming materials is foamed and molded in a batch process can be employed. In forming the foam film, a surface layer may be removed by slicing to adjust the film to obtain desirable thickness and foam characteristics.

The thermoplastic polymer (e.g. a polyolefinic polymer) that can be included in the foam film may comprise a thermoplastic elastomer that exhibits properties of rubber at room temperature, but shows thermoplasticity at a high temperature. From the standpoint of the flexibility and conformability one, two or more species can be used among thermoplastic elastomers, or instance, olefinic elastomers such as ethylene-propylene copolymer, ethylene-propylene-diene copolymer, ethylene-vinyl acetate copolymer, polybutene, polyisobutylene, and chlorinated polyethylene; styrene-based elastomers such as styrene-butadiene-styrene copolymer; thermoplastic polyester-based elastomers; thermoplastic polyurethane-based elastomers; and thermoplastic acrylic elastomers. Among them, a thermoplastic elastomer having a glass transition temperature of room temperature or lower (e.g. 20° C. or lower). The thermoplastic elastomer content in the foam film is preferably about 10% by weight or more (e.g. 20% by weight or more) of the thermoplastic polymer in the foam film; it is preferably about 90% by weight or less (e.g. 80% by weight or less).

From the standpoint of the ease of mixing a foam-forming gas and the foam stability, as the foaming agent, various surfactants can be used in the foam film-forming material (e.g. an emulsion-based acrylic resin composition), with examples including anionic surfactants, cationic surfactants, nonionic surfactants and amphoteric surfactants. Hydrocarbon-based and fluorine-based surfactants can be used as well. In particular, from the standpoint of reducing the pore diameters and stabilizing the foam, anionic surfactants are preferable; ammonium salts of fatty acids (typically ammonium salts of higher fatty acids) such as ammonium stearate are more preferable. For the surfactant, solely one species or a combination of two or more species can be used. The surfactant content is preferably about 0.1 part by weight or greater (e.g. 0.5 part by weight or greater); it is preferably 10 parts by weight or less (e.g. 8 parts by weight or less) to 100 parts by weight of the base polymer of the foam film. The foaming agent in this description includes not only an agent that shows foaming capabilities, but also a pore diameter-adjusting agent to reduce the foam diameters as well as a foam stabilizer such as a foam-adjusting agent.

When the foam film-forming material is an aqueous dispersion (e.g. an acrylic emulsion), it is preferable to use a silicone-based compound as the foaming agent. By this, the recovery of thickness (the degree and speed of recovery) after compression tends to improve. A preferable silicone-based compound has 2000 or fewer siloxane bonds. Examples of the silicone-based compound include silicone oil, modified silicone oil, and silicone resin. In particular, dimethyl silicone oil and methyl phenyl silicone oil are preferable. As the silicone-based compound, a silicone-modified polymer (e.g. a silicone-modified acrylic polymer, a silicone-modified urethane-based polymer, etc.) can be used as well. These can be used solely as one species or in a combination of two or more species. The silicone compound content is preferably about 0.01 part by weight or greater (e.g. 0.05 part by weight or greater, typically 0.1 part by weight or greater) to 100 parts by weight of the base polymer of the foam film; it is preferably about 5 parts by weight or less (e.g. 4 parts by weight or less, typically 3 parts by weight or less).

From the standpoint of stabilizing the foam and increasing the ease of film formation, the foam film-forming material (e.g. an emulsion-based acrylic resin composition) may comprise a thickener. The thickener is not particularly limited. Examples include acrylic acid-based thickeners, urethane-based thickeners and polyvinyl alcohol-based thickeners. In particular, polyacrylic acid-based thickeners and urethane-based thickeners are preferable. The thickener content is preferably about 0.1 part to 10 parts by weight (e.g. 0.1 part to 5 parts by weight) to 100 parts by weight of the base polymer of the foam film.

When a foam-containing substrate is used as the film substrate, the foam film preferably comprises a foam-nucleating agent such as a metal hydroxide (e.g. magnesium hydroxide). This tends to facilitate the adjustment of the average pore diameter in the foam film to obtain desirable impact-absorbing properties, flexibility and so on. The foam-nucleating agent can be a metal oxide, composite oxide, metal carbonate, metal sulfate, etc. The foam-nucleating agent content is preferably about 0.5 part by weight or greater (e.g. 1 part by weight or greater) to 100 parts by weight of the base polymer of the foam film; it is preferably about 125 parts by weight or less (e.g. 120 parts by weight or less).

When using a foam-containing substrate as the film substrate, from the standpoint of inhibiting the foam from degassing while pores are being formed, the foam film preferably comprises a degassing inhibitor such as fatty acid amides. Amore preferable fatty acid amide has a bis-amide structure. The degassing inhibitor can be a metal salt of a fatty acid as well. The degassing inhibitor content is preferably about 0.5 part by weight or greater (e.g. 0.7 part by weight or greater, typically 1 part by weight or greater) to 100 parts by weight of the base polymer of the foam film; it is preferably about 10 parts by weight or less (e.g. 8 parts by weight or less, typically 6 parts by weight or less).

The film substrate (e.g. a foam film) may comprise a softener so as to provide desirable fluidity to the film-forming material thereby to improve properties such as flexibility. With the inclusion of a softener in the foam film, properties such as ease of stretching the film and expansion ratio can be preferably adjusted. For example, one, two or more species can be preferably used among hydrocarbon-based softeners such as liquid paraffin, paraffin wax, micro wax and polyethylene wax; ester-based softeners such as glyceryl stearate; and fatty acid-based softeners. The softener content is preferably 0.5 part by weight or greater (e.g. 0.8 part by weight or greater, typically 1 part by weight or greater) to 100 parts by weight of the base polymer of the film substrate (e.g. a foam film); it is preferably 50 parts by weight or less (e.g. 40 parts by weight or less, typically 30 parts by weight or less).

When emulsion-based acrylic resin foam is used, an arbitrary anticorrosive may be included to prevent corrosion of metal parts adjacent to the foam film. As the anticorrosive, an azole ring-containing compound is preferable. With the use of an azole ring-containing compound, inhibition of metal corrosion and tight adhesion to adherends can be combined at a high level. In particular, a compound with the azole ring forming a fused ring with an aromatic ring such as a benzene ring is preferable; benzotriazole-based compounds and benzothiazole-based compounds are especially preferable. The anticorrosive content is preferably about 0.2 part by weight or greater (e.g. 0.3 part by weight or greater) to 100 parts by weight of the base polymer of the foam film; it is preferably about 5 parts by weight or less (e.g. 2 parts by weight or less).

In a preferable embodiment, the film substrate is transparent (including semi-transparency). In the PSA sheet comprising such a film substrate, bubbles trapped upon application of the PSA sheet as well as bubbles caused by outgassing after the application and the like can be seen from the outside, likely degrading the appearance. The art disclosed herein prevents the trapping and formation of bubbles at the interface between the PSA sheet and the adherend; and therefore, an excellent appearance can be obtained in an embodiment comprising a transparent substrate. In particular, the film substrate may show a total light transmittance of 80% or higher (e.g. 90% or higher, typically 95% or higher). The film substrate preferably has a haze value of 10% or lower (e.g. 5% or lower).

To obtain desirable designs and optical properties, the film substrate (e.g. a resin film) may be colored black, white or other with various types of colorant (e.g. pigment) content. As a black colorant, carbon black is preferable. It is also possible to employ a method where at least one surface (one or each face) of the film substrate is subjected to printing to overlay one, two or more colored layers (e.g. a black layer and a white layer).

To the film substrate (e.g. a resin film substrate, a foam film substrate), various additives may be added as necessary, such as filler (inorganic filler, organic filler, etc.), anti-aging agent, antioxidant, UV absorber, antistatic agent, slip agent and plasticizer.

When the PSA sheet is adhesive on one face, between the two surfaces of the film substrate, the surface (back face) opposite from the surface to be provided with a PSA layer is preferably made smooth. The smooth surface may be the outer face of the PSA sheet; and therefore, when the PSA sheet having the smooth surface is used as, for instance, a decorative sheet or a surface protection sheet, it may provide a better appearance (design). In a preferable embodiment, from the standpoint of the adhesive properties and the quality of appearance (design), the arithmetic average roughness of back face of the film substrate can be 1 µm or less (e.g. about 0.75 µm or less, typically about 0.5 µm or less); it can be about 0.05 µm or greater (typically about 0.1 µm or greater).

When an adhesively single-faced PSA sheet is wound to bring the back face of the film substrate in contact with the PSA layer surface, the back face (opposite from the surface to be provided with a PSA layer) of the film substrate may be subjected as necessary to release treatment with a silicone-based, long chain alkyl-based, fluorine-based release agent or the like. The release treatment brings about effects such as easier unwinding of the PSA sheet wound in a roll.

On the other hand, the PSA layer-side surface of the film substrate may be subjected to a heretofore known surface treatment such as corona discharge treatment and primer coating for purposes such as increasing the tightness of adhesion between the substrate and the PSA layer. When the USA sheet is a substrate-supported double-faced USA sheet, both faces of the substrate can be subjected to the surface treatment to increase the tightness of adhesion between the substrate and the PSA layer.

The thickness of the film substrate is not particularly limited and can be suitably selected in accordance with the purpose. In general, the substrate's thickness is usually suitably 1 µm or larger (e.g. about 2 µm or larger), or preferably about 5 µm or larger (e.g. 10 µm or larger, typically 15 µm or larger); the thickness is suitably for instance, about 500 µm or smaller, or preferably about 200 µm or smaller (typically 100 µm or smaller). In a preferable embodiment, the thickness of the film substrate is about 30 µm or smaller, more preferably 12 µm or smaller, or yet more preferably smaller than 10 µm (e.g. smaller than 5 µm, typically smaller than 3 µm). It is advantageous to limit the thickness of the film substrate in view of making the PSA sheet thinner, smaller, lighter, resources-saving, and so on.

When the film substrate comprises a foam film, the thickness of the foam-containing substrate (e.g. a foam film substrate) can be suitably selected in accordance with the strength and flexibility of the PSA sheet, intended purposes and so on. From the standpoint of the impact-absorbing properties, etc., the foam-containing substrate has a thickness of suitably 30 µm or larger, preferably 50 µm or larger, or more preferably 60 µm or larger (e.g. 80 µm or larger). From the standpoint of making the PSA sheet thinner, smaller, lighter, resource-saving, and soon, the thickness of the foam-containing substrate is usually suitably 1 mm or smaller. The use of the foam film disclosed herein can bring about excellent impact-absorbing capabilities even when the thickness is about 350 µm or smaller (more preferably 250 µm or smaller, e.g. 180 µm or smaller). The thickness of the foam film (possibly a foam layer) in the foam-containing substrate can also be preferably selected from the ranges exemplified as the thickness of the aforementioned foam-containing substrate.

(Filler)

In some embodiments, as the substrate of the PSA sheet disclosed herein, a substrate comprising a filler that is conductive at least either thermally or electrically. Hereinafter, the term "thermally/electrically conductive (thermal/electric conductivity)" may be used, meaning at least either thermally or electrically conductive (thermal or electric conductivity). The use of the thermally/electrically conductive filler may improve the thermal/electric conductivity of the PSA sheet. The PSA sheet disclosed herein is less susceptible to formation and growth of bubbles caused by outgassing even when used in an embodiment where the adherend is likely to outgas. Accordingly, it can inhibit an event such as a decrease in bonding area between the PSA sheet and the adherend with lowering of the thermal/electric conductivity whereby fluctuations in thermal/electric conductivity can be reduced. In an embodiment where the PSA sheet is a double-faced PSA sheet, fluctuations in thermal electric conductivity can be reduced between the members bonded together or fixed to each other via the PSA sheet.

As the thermally conductive filler, a filler capable of increasing the thermal conductivity of the PSA sheet can be used without particular limitations. For instance, a particulate or fibrous filler can be used. Possible examples of the material forming the filler (typically a particulate filler) include inorganic materials such as metals including copper, silver, gold, platinum, nickel, aluminum, chromium, iron, and stainless steel; metal oxides including aluminum oxide, silicon oxide (silicon dioxide), titanium oxide, zirconium oxide, zine oxide, tin oxide, copper oxide, and nickel oxide; metal hydroxides and hydrated metal compounds including aluminum hydroxide, boehmite, magnesium hydroxide, calcium hydroxide, zinc hydroxide, silica, iron hydroxide, copper hydroxide, barium hydroxide, hydrated zirconium oxide, hydrated tin oxide, basic magnesium carbonate, hydrotalcite, dawsonite, borax, and zinc borate; carbides including silicon carbide, boron carbide, nitrogen carbide, and calcium carbide; nitrides including aluminum nitride, silicon nitride, boron nitride, and gallium nitride; carbonates including calcium carbonate; titanates including barium titanate and potassium titanate; carbon-based substances including carbon black, carbon tube (carbon nanotube), carbon fibers, and diamond; and glass. Alternatively, particles of a natural raw material can also be used, such as volcanic shirasu (ash), clay and sand. As the fibrous filler, various synthetic fiber materials and natural fiber materials can be used. These can be used singly as one species or in a combination of two or more species. From the standpoint of the dispersibility to the base material, etc., a particulate filler can be preferably used. In particular, a particulate filler formed of an inorganic material (e.g. a metal hydroxide such as aluminum hydroxide or a hydrated metal compound) is preferably used.

As the electrically conductive filler, a filler capable of increasing the electric conductivity of the PSA sheet can be used without particular limitations. For instance, among the thermally conductive fillers listed above, electrically conductive materials (e.g. metals and carbon-based substances) can be used as the electrically conductive filler. Among them, electrically conductive fillers formed of highly electrically conductive metals such as copper, silver, gold, platinum, nickel and aluminum are preferable. A particulate electrically conductive filler can be preferably used.

From the standpoint of the handling properties, dispersibility, etc., the thermally/electrically conductive filler (or simply the "filler" hereinafter) may have a mean particle diameter of for instance, 0.5 µm or larger, 1 µm or larger, 3 µm or larger, or even 5 µm or larger. From the standpoint of the surface smoothness of the filler-containing substrate, the filler's mean particle diameter is usually suitably 100 µm or smaller, for instance, possibly 50 µm or smaller, 30 µm or smaller, or even 20 µm or smaller.

From the standpoint of increasing the thermal conductivity; the filler content (by weight) of the entire substrate can be, for instance, 5% by weight or higher, 10% by weight or higher, 20% by weight or higher, or even 30% by weight or higher. From the standpoint of the strength and surface smoothness of the substrate, the filler content of the entire substrate can be, for instance, 60% by weight or lower, 50% by weight or lower, or even 40% by weight or lower.

In the PSA sheet having such a filler-containing substrate, the PSA layer of the PSA sheet may comprise a filler or may be fee of a filler. Alternatively, the PSA sheet disclosed herein may have a configuration where a PSA layer comprising an aforementioned filler is placed on a filler-free substrate or it can be a substrate-free PSA sheet formed of a PSA layer comprising an aforementioned filler. When the PSA layer comprises a filler, the tiller can be selected among the same fillers as the possible examples given above for use in the substrate; and the material, form, mean particle diameter, amount added and so on can also be selected from the same ranges as the filler in the substrate.

<Release Liner>

The release liner is not particularly limited. For instance, it is possible to use a release liner having a release layer on the surface of a liner substrate such as resin film (e.g. polyethylene terephthalate (PET)) or paper as well as a release liner formed of a low-adhesive material such as a fluoropolymer (tetrafluoroethylene, etc.) or a polyolefinic resin (polyethylene (PE), polypropylene (PP), etc.). Favorable examples of the release liner disclosed herein include a release liner having a release layer at least on one face of polyester film such as PET as well as paper (e.g. high-grade paper) laminated with plastic film (e.g. PE resin) on one or each side. The release layer can be formed, for instance, by subjecting the liner substrate to a surface treatment with a release agent such as a silicone-based, a long-chain alkyl-based, a fluorine-based, a molybdenum disulfide-based release agent or the like.

In the PSA sheet having an indented pattern on an adhesive face (typically the surface of a PSA layer), for instance, as in release liner 100 shown in FIG. 3, the release liner used for surface protection during the preparation or pre-use period of the PSA sheet may have a release face on which a raised pattern 60 is formed corresponding to the indented pattern of the PSA layer. The method for obtaining a release liner having such a surface structure is not particularly limited and a heretofore known method can be suitably employed. Examples include a method where the indentation is formed by embossing a pre-formed film substrate (resin film), using an emboss roller having a surface design inverted from the desired surface structure as well as a method where film substrate formation and indentation are carried out concurrently by allowing a melted resin film material to be touched with and cooled on the emboss roller. Other methods include a method where the surface of a pre-formed film substrate is provided with a suitable material such as a printing ink or a curable resin composition to obtain the desired surface structure (e.g. the pattern corresponding to the indentation and the thickness corresponding to the indentation's depth $D_R$). Among these methods, solely one method or a combination of two or more methods can be used.

Figure 7:
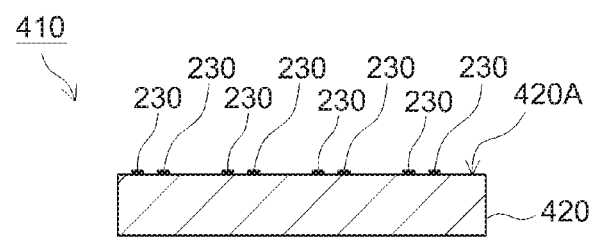
FIG. 7 shows a cross-sectional diagram illustrating a coated release liner used in preparing the PSA sheet according to another embodiment.

In the PSA sheet in which the PSA layer surface is partially covered with a coating layer, for instance, as shown in FIG. 7, the PSA sheet can be prepared using a coating layer-bearing release liner having a releasable support 420 with a release face 420A. Releasable support 420 may have a release layer at least on one face of a liner substrate or it may be a support formed of a low-adhesive material. Release face 420A of releasable support 420 is provided with a coating layer 230 that can be transferred to a PSA layer. In other words, coating layer 230 is placed on release face 420A, in a state where it can be separated from release face 420A by the PSA's adhesive strength, etc. With the use of such release liner 410 having a transferrable coating layer 230 on the surface, the PSA sheet disclosed herein is preferably fabricated. The features (shape, arrangement, relative position, size, pattern, etc.) of the coating layer provided to the release face of the releasable support are basically the same as the features of the coating layer on the adhesive face of the PSA sheet described earlier. Thus, details are omitted. When the liner substrate has a release layer on each face thereof, from the standpoint of the ease of removal, etc., the peel strength may be varied between the respective release faces; for instance, the release face on which the coating layer is formed can have a lower peel strength than the release face on the opposite side. The peel strength can be determined by the same method as for the liner peel strength.

In some embodiments of the release liner (release film) having a transferrable coating layer on the PSA layer as above, the release liner's release face (on which the coating layer is formed) can have an arithmetic average roughness of 0.1 µm or greater. With the release liner's release face having an arithmetic average roughness of 0.1 µm or greater, the contours (depressions and protrusions) indicated by the roughness value are transferred to the coating layer surface opposing the release face. In the PSA sheet fabricated by transferring such a coating layer on the release face to the PSA layer, when applied to an adherend, the surface structure of the coating layer creates voids at the interface with the adherend, improving the gas flow at the interface between the coating layer surface and the adherend. This may better prevent the formation and trapping of bubbles caused by outgassing. The arithmetic average roughness is preferably 0.2 µm or greater, for instance, greater than 1 µm. From the standpoint of avoiding too high a liner peel strength, the arithmetic average roughness of the release face is suitably about 5 µm or less. The arithmetic average roughness can be adjusted by subjecting the surface of the release liner (typically a release liner substrate) to a process such as roller embossing and sandblasting. For instance, sandblasting or a rolling process with a sandblasted roll is employed to form irregular contours on the release liner's release face. Alternatively, after a roughened layer is formed (e.g. possibly from grain-containing ink) on the release liner surface, release treatment can be provided over it to adjust the release liner's release face to an arithmetic average roughness of 0.1 µm or greater. Here, the arithmetic average roughness can be determined, using a general surface roughness gauge (e.g. non-contact three-dimensional surface profilometer under model name WYKO NT-3300 available from Veeco).

The thickness (total thickness) of the release liner is not particularly limited. From the standpoint of the ease of removal, handling properties, strength, etc., it is preferably about 10 µm or greater, for instance, possibly about 15 µm or greater. The release liner's thickness can be, for instance, about 500 µm or less, or even about 100 µm or less.

<Composite Body>

The present description provides a composite body comprising a PSA sheet disclosed herein, and a member having a surface formed of a plastic material that may outgas (a potential outgassing plastic material); wherein the PSA sheet adhered to the surface formed of the plastic material. The PSA sheet is constituted to be less susceptible to outgassing bubble formation even when outgassing of the adherend occurs. Thus, the composite body may provide highly reliable bonding between the member and the PSA sheet. The unlikelihood of outgassing bubble formation is also preferable in view of increasing the aging stability of the thermal/electric conductivity between the member and the PSA sheet.

In the composite body disclosed herein, the PSA sheet is a double-faced PSA sheet; one (first) adhesive face of the double-faced PSA sheet is adhered to the surface of the member (first member) whose surface is formed of the potential outgassing plastic material; and the composite body may further comprise another member (second member) to which the second adhesive face of the double-faced PSA sheet is adhered. As for the composite body in such an embodiment, because of the function of the double-faced PSA sheet, highly reliable bonding can be obtained between the first and second members. In addition, the double-faced PSA sheet may also work to provide excellent aging stability to the thermal/electric conductivity between the first and second members. The double-faced PSA sheet can be a substrate-supported double-faced PSA sheet or a substrate-free double-faced PSA sheet. The surface of the second member to which the second adhesive face of the double-faced PSA sheet is applied may be formed of a potential outgassing plastic material or an essentially non-outgassing material. In the first case, the second adhesive face of the double-faced PSA sheet is desirably formed to be less susceptible to outgassing bubble formation.

The potential outgassing plastic material is not particularly limited. Examples include a polycarbonate resin, acrylic resin, polystyrene resin, acrylonitrile-butadiene-styrene copolymer resin and vinyl chloride resin as well as a blend or composite material including at least one species among these.

In the composite body, the potential outgassing plastic material may have an outgassing amount of, for instance, 100 µL/g or greater in an outgassing test where it is heated at 85° C. for 15 hours. This means that the volume of gas outgassed (released) in the outgassing test is at least 100 µL per gram of the plastic material. As used herein, the outgassing amount by volume indicates the gas volume outgassed at 85° C. at 1 atm. According to the art disclosed herein, even in a composite body wherein a PSA sheet is adhered to a surface formed of a plastic material that outgasses in a large amount as described above, outgassing bubble formation can be effectively inhibited. A typical example of the plastic material having an outgassing amount of at least 100 µL/g is polycarbonate resin.

The outgassing amount can be determined by the following method in particular. Approximately 6 g of the plastic material (specimen) stored for a long time in a thermostatic chamber at 23° C. and 50% RH is placed and sealed in a 22 mL vial in the same thermostatic chamber. After the vial is heated at 85° C. for 15 hours, at 85° C., a 1 mL sample is collected from the gas phase and analyzed by gas chromatography. Water is quantified by a thermal conductivity detector and organic compounds are quantified by mass spectrometry. As a blank, the air inside the thermostatic chamber is analyzed. From the difference in gas concentration between the blank and the sample collected from the heated vial with the plastic material enclosed therein, the weight of gas outgassed from 1 g of plastic material in the outgassing test is determined and converted to the volume at 85° C. at 1 atm using the ideal gas law (see Toagosei Group Report, TREND 2014, vol. 17, p. 12). As for the specimen to be enclosed in the vial, or instance, a flat mold (cast) of about 1 mm to 3 mm (e.g. about 2 mm) formed of the plastic material subject to analysis can be cut to a size that can be enclosed in the vial and used.

In the PSA sheet forming the composite body, the largest possible inscribed circle of the adhesive face of the PSA sheet preferably has a diameter of about 3 cm or greater. With increasing diameter of the inscribed circle, bubble formation caused by outgassing of the adherend tends to be more likely. Thus, it is further significant to apply the art disclosed herein to inhibit the outgassing bubble formation. In some embodiments, the diameter of the inscribed circle can be, for instance, 5 cm or larger, 7 cm or larger, 10 cm or larger, or even 15 cm or larger. The maximum diameter of the inscribed circle is not particularly limited. The diameter of the inscribed circle can be, for instance, 40 cm or smaller, 30 cm or smaller, or even 20 cm or smaller.

<Applications>

As described above, when applied, the PSA sheet disclosed herein has an ability to inhibit formation and growth of bubbles caused by possible outgassing of the adherend. This can reduce the influence of aging and storage conditions on the reliability of bonding to the adherend. Especially, when the PSA sheet is used for bonding a rigid member or when it is applied to the inner surface of a rigid case or to a member placed in the case, with respect to bubbles newly formed (typically bubbles caused by outgassing) after the application, a bubble-eliminating means is not available, such as directly pushing the back face of the PSA sheet to forcefully move the bubbles to an edge of the adhesive face and push them out. Thus, in such an application, it is particularly significant to apply the art disclosed herein and inhibit post-application bubble formation.

From such a standpoint, the PSA sheet disclosed herein can be preferably used in an embodiment where it is applied to a component of an electronic device. For instance, it can be used for bonding or fixing a component (preferably a rigid component) of an electronic device. Because the interior of the case constituting the electronic device may reach a high temperature due to operation of the electronic device, etc., depending on the adherend material, outgassing is likely to occur, leading to post-application bubble formation. Thus, the PSA sheet disclosed herein can be preferably used in an embodiment where it is applied to the inner surface of a case constituting an electronic device or in an embodiment where it is applied to a member placed in the case. Examples of the electronic device referred to here include electronic devices installed in vehicles possibly exposed to high temperatures (e.g. electronic running gear such as engine, transmission and brake; operation terminals such as a car navigation system; and indicator instruments such as speedometer) as well as television sets and computers having various displays (e.g. liquid crystal display panels, organic electro-luminescence (EL) display panels, plasma display panels, etc.). The electronic device can be stationary or portable.

The PSA sheet disclosed herein can be preferably used for portable electronic devices because there is a strong demand for reliable and stable bonding (e.g. no or little changes in thermal/electric conductivity). Thus, it can be preferably used for applications (e.g. for mobile electronics) where a thinner build and a lighter weight are required desirably with saving of resources. In particular, it can be preferably used as a surface protection sheet for mobile electronics such as mobile phones, smartphones, tablet PCs, notebook PCs, various wearable devices (e.g. wrist wearables put on wrists such as wrist watches; modular devices attached to bodies with clips, straps, etc.; eye wears including eye glass types (monocular or binocular, including head-mounted pieces); clothing types worn as, for instance, accessories on shirts, socks, hats/caps, etc.; ear-mounted pieces put on ears such as earphones), digital cameras, digital video cameras, acoustic equipment (portable music players, IC recorders, etc.), computing devices (calculators, etc.), portable game devices, electronic dictionaries, electronic notebooks, electronic books, automotive information systems, portable radios, portable televisions, portable printers, portable scanners, and portable modems; for bonding/fixing applications in liquid crystal displays of these mobile electronics; for fixing protection panels (lenses) to protect the displays of these mobile electronics; for fixing key modules of mobile phones; for fixing rim sheets, decorative panels, batteries, and various other parts; fixing labels (including various marks) such as logos (letter logos) and various designs (symbols); and for like purposes. In this description, to be "mobile," it is not sufficient that it can be just carried, but it needs to be mobile enough for an individual (an average adult) to be able to carry it by hand relatively easily.

The matters disclosed by this description include the following:

(1) A PSA sheet comprising a PSA layer that forms an adhesive face, wherein in an aging test where the adhesive face is press-bonded to a glass plate and the resultant is stored at 50° C. for 24 hours, the PSA sheet has a percent post-aging non-bonding area Sa of 5% or higher, with Sa defined as the ratio of all areas non-bonding to the glass plate (not in contact with the glass plate) relative to the total area of the adhesive face.

(2) The PSA sheet according to (1) above, wherein the post-aging-test non-bonding areas are formed continuously up to the edges of the adhesive face.

(3) The PSA sheet according to (1) or (2) above, wherein the adhesive face has indentations forming a pattern in planar view of the PSA layer and the post-aging-test non-bonding areas are formed along the pattern formed with the indentations (the indented pattern).

(4) The PSA sheet according to (3) above, wherein the indentations have a depth of 0.2 μm or greater.

(5) The PSA sheet according to (3) or (4) above, wherein the indented pattern is formed of a first stripe pattern and a second stripe pattern placed to intersect the first stripe pattern, wherein the first stripe pattern in the indented pattern is formed with grooves having a width of 0.01 mm or greater and 2 mm or less.

(6) The PSA sheet according to (5) above, wherein the grooves forming the first stripe pattern in the indented pattern have a width of 0.05 mm or greater and 2 mm or less.

(7) The PSA sheet according to (5) above, wherein the grooves forming the first stripe pattern in the indented pattern have a width of 0.20 mm or greater and 1.2 mm or less.

(8) The PSA sheet according to any of (5) to (7) above, wherein the grooves forming the first stripe pattern in the indented pattern have a width of 1.0 mm or greater and 10 mm or less.

(9) The PSA sheet according to any of (5) to (7) above, wherein the grooves forming the first stripe pattern in the indented pattern have an interval of 1.8 mm or greater and 10 mm or less.

(10) The PSA sheet according to any of (5) to (7) above, wherein the grooves forming the first stripe pattern in the indented pattern have an interval of 2.5 mm or greater and 8 mm or less.

(11) The PSA sheet according to any of (1) to (10) above, having a mating layer placed on the surface of the PSA layer while partially covering the surface and arranging a pattern in planar view of the PSA layer, and the post-aging-test non-bonding areas are formed along the pattern arranged with the coating layer (the coating layer pattern).

(12) The PSA sheet according to (11) above, wherein the coating layer pattern is formed of a first stripe pattern and a second stripe pattern placed to intersect the first stripe pattern, wherein the first stripe pattern in the coating layer pattern are formed with stripes having a width of 0.01 mm or greater and 2 mm or less.

(13) The PSA sheet according to (12) above, wherein the stripes forming the first stripe pattern in the coating layer pattern have a width of 0.05 mm or greater and 2 mm or less.

(14) The PSA sheet according to (12) above, wherein the stripes forming the first stripe pattern in the coating layer pattern have a width of 0.20 mm or greater and 1.2 mm or less.

(15) The PSA sheet according to any of (12) to (14) above, wherein the stripes forming the first stripe pattern in the coating layer pattern have a width of 1.0 mm or greater and 10 mm or less.

(16) The PSA sheet according to any of (12) to (14) above, wherein the stripes forming the first stripe pattern in the coating layer pattern have an interval of 1.8 mm or greater and 10 mm or less.

(17) The PSA sheet according to any of (12) to (14) above, wherein the stripes forming the first stripe pattern in the coating layer pattern have an interval of 2.5 mm or greater and 8 mm or less.

(18) The PSA sheet according to any of (1) to (17) above, constituted so that the post-aging-test non-bonding areas form a lattice pattern.
(19) The PSA sheet according to any of (1) to (18) above, having a percent initial non-bonding area Si of 5% or higher and 35% or lower, with Si defined as the ratio of all areas non-bonding to the glass plate relative to the total area of the adhesive face immediately after the adhesive face is press-bonded to the glass plate.
(20) The PSA sheet according to any of (1) to (19) above, wherein the PSA layer is an acrylic PSA layer comprising an acrylic polymer as its base polymer.
(21) The PSA sheet according to any of (1) to (20) above, wherein the PSA layer is formed from a PSA composition comprising a base polymer and a crosslinking agent.
(22) The PSA sheet according to (21) above, wherein the crosslinking agent is used in an amount of 2.0 parts by weight or more, 3.5 parts by weight or more, more than 5.0 parts by weight, or more than 6.5 parts by weight, relative to 100 parts by weight of the base polymer.
(23) The PSA sheet according to any of (1) to (22) above, wherein the PSA layer has a thickness of 20 μm or less, 15 μm or less, less than 10 μm, less than 7 μm, or less than 5 μm.
(24) The PSA sheet according to any of (1) to (23) above, having a percent initial non-bonding area Si which is defined as the ratio of all areas non-bonding to the glass plate relative to the total area of the adhesive face immediately after the adhesive face is press-bonded, and satisfying Sa/Si≥0.60 in relation to the percent post-aging non-bonding area Sa.
(25) The PSA sheet according to any of (1) to (24) above, having a percent to-PC-plate initial non-bonding area S0 and a percent to-PC-plate post-aging non-bonding area S1, satisfying the relation S1−S0≤20%, wherein S0 is defined as, immediately after the adhesive face is press-bonded to a polycarbonate resin plate (PC plate), the ratio of all areas non-bonding to the PC plate relative to the total area of the adhesive face; and S1 is defined as, in an aging test where the adhesive face is press-bonded to the PC plate and stored at 50° C. for 24 hours, the ratio of all areas non-bonding to the PC plate relative to the total area of the adhesive face.
(26) The PSA sheet according to any of (1) to (25) above, having an initial peel strength F0 and a post-aging peel strength F1, satisfying the relation F1/F0≥0.60, wherein F0 is determined at a tensile speed of 300 mm/min at a peel angle of 180° at 30 minutes after the adhesive face is applied to a PC plate; and F1 is determined at a tensile speed of 300 mm/min at a peel angle of 180° after the following procedures; the adhesive face is applied to the PC plate and the resultant is stored for 24 hours in a hot and humid environment at 85° C. and 85% RH and then for 30 minutes in a standard environment at 23° C. and 50% RH.
(27) The PSA sheet according to (26) above, wherein the post-aging peel strength F1 is 2.5 N/20 mm or greater and F1/F0 is 0.70 or higher.
(28) The PSA sheet according to any of (1) to (27) above, used in an embodiment where the adhesive face has a largest possible inscribed circle of about 3 cm in diameter.
(29) The PSA sheet according to any of (1) to (28) above, used as a double-faced PSA sheet for bonding or fixing a member.
(30) The PSA sheet according to (29) above, wherein the member has a surface formed of a plastic material having an outgassing amount of 100 μL/g or greater in an outgassing test where it is heated at 85° C. for 15 hours, and the PSA sheet is used by applying the adhesive face to the surface formed of the plastic material.
(31) The PSA sheet according to any of (1) to (30) above, comprising a film substrate and the PSA layer placed on at least one face of the film substrate.
(32) A composite body comprising the PSA sheet according to any of (1) to (31) above and a member having a surface formed of a plastic material having an outgassing amount of 100 μL/g or more in an outgassing test where it is heated at 85° C. for 15 hours, wherein the PSA sheet is adhered on the surface formed of the plastic material.
(33) The composite body according to (32) above, wherein the plastic material comprises at least one species selected from the group consisting of a polycarbonate resin, acrylic resin, polystyrene resin, acrylonitrile-butadiene-styrene copolymer resin and vinyl chloride resin.
(34) The composite body according to (32) or (33) above, wherein the PSA sheet has an adhesive face having a largest possible inscribed circle of about 3 cm in diameter.

EXAMPLES

Several Examples related to the present invention are described below, but the present invention is not intended to be limited to these Examples. In the description below, "parts" and "%" are by weight unless otherwise noted.
<Preparation of Release Film>
(Release Film R1)
On one face of 75 μm thick polyester resin film (product name LUMIRROR S10 available from Toray Industries, Inc.), was formed a raised lattice pattern and the raised pattern-bearing face was treated with a silicone-based release agent to prepare a release film R1. The raised pattern is formed of a first stripe pattern consisting of several ridges linearly extending in parallel to one another and a second stripe pattern consisting of several ridges linearly extending in parallel to one another and vertically intersecting the first stripe pattern. Each ridge forming the first or second stripe pattern extends in a direction that forms a 45° angle with the length direction of the film substrate, with its two ends reaching outer edges of the film substrate. Each ridge forming the first or second stripe pattern has a height of 2.0 μm and a width of 0.2 mm. The ridges forming each stripe pattern have an interval of 1.8 mm and a pitch of 2.0 mm. The area of the raised pattern corresponds to 19% of the total area of the raised-pattern-bearing face.
(Release Film R2)
Was obtained a release film (product name #75 CERAPEEL MDA (S) available from Toray Industries, Inc.) formed of 75 μm thick polyester resin film treated with a silicone-based release agent on one face. The release face of the release film was gravure-printed with a coating layer-forming material (a curable two-pack urethane-based ink) to form a coating layer in a lattice pattern. The lattice pattern was formed of a first stripe pattern formed with several parallel straight lines of the coating layer and a second stripe pattern formed with several parallel straight lines of the coating layer vertically intersecting the first stripe pattern. Each coating layer line forming the first or second stripe pattern extends in a direction that forms a 45° angle with the length direction of the film substrate, with its two ends reaching outer edges of the film substrate. Each coating layer line forming the first or second stripe pattern has a thickness of 2.0 μm and a width of 0.2 mm. The coating layer lines forming each stripe pattern have an interval of 1.8 mm and a pitch of 2.0 mm. The area of the coating layer corresponds to 19% of the total area of the coating layer-bearing release face.

In Examples 1 to 5 below, as release film R3, was used product name DIAFOIL MRF38 (38 μm thick PET film treated with release agent on one face) available from Mitsubishi Plastics, Inc. The release face of release film R3 is smooth, free of a raised pattern. No coating layer is formed on the release face of release film R3.

<Preparation of Acrylic Polymer>

(Acrylic Polymer A)

In a reaction vessel equipped with a stirrer, thermometer, nitrogen inlet, reflux condenser and addition funnel, were placed 70 parts of n-butyl acrylate, 27 parts of 2-ethylhexyl acrylate, 3 parts of acrylic acid, 0.05 part of 4-hydroxybutyl acrylate, 0.08 part of azobisisobutylonitrile as polymerization initiator and 135 parts of toluene as the polymerization solvent. The mixture was allowed to stir under a nitrogen flow for two hours.

After oxygen was thus eliminated from the system, was added 0.1 part of 2,2'-azobisisobutylonitrile (AIBN) and polymerization was carried out at 60° C. for 6 hours to obtain a toluene solution of acrylic polymer A. The solid content (non-volatiles) of the toluene solution was 42.5%. Acrylic polymer A had a Mw of about $40 \times 10^4$.

(Acrylic Polymer B)

Into a reaction vessel equipped with a stirrer, thermometer, nitrogen gas inlet, reflux condenser and addition funnel, were added 92 parts of n-butyl acrylate, 5 parts of vinyl acetate, 2.9 parts of acrylic acid and 0.1 part of hydroxyethyl acrylate as well as 30 parts of ethyl acetate and 120 parts of toluene as the polymerization solvent. The resulting mixture was allowed to stir under a nitrogen flow for two hours.

After oxygen was thus eliminated from the system, was added 0.2 part of AIBN and polymerization was carried out at 60° C. for 6 hours to obtain a toluene solution of acrylic polymer B. The solid content (non-volatiles (NV)) of the toluene solution was 40.0%. Acrylic polymer B had a Mw of about $55 \times 10^4$.

<Preparation of PSA Sheet>

Example 1

To 100 g (42.5% NV) of the toluene solution of acrylic polymer A, was added 4.0 g (as it was) of product name CORONATE L (aromatic polyisocyanate, 75% NV) available from Tosoh Corporation as a crosslinking agent and uniformly mixed to prepare a PSA composition C1. The amount of crosslinking agent added corresponds to 7.1 parts of aromatic polyisocyanate to 100 parts of acrylic polymer A in the toluene solution.

To the release face of release film R3, was applied the PSA composition C1 and allowed to dry at 100° C. for 2 minutes to form a 9 μm thick PSA layer 1-a. To the PSA layer 1-a, was adhered the first face of PET film (product name LUMIRROR #12S10 available from Toray Industries, Inc., 12 μm thick) as a support substrate. To the raised-pattern-bearing face of release film R1, was applied the PSA (composition C1 and allowed to dry at 100° C. for 2 minutes to form a 9 μm thick PSA layer 1-b. Subsequently, to the PSA layer 1-b, was adhered the second face of the support substrate to prepare a substrate-supported double-faced PSA sheet having a total thickness of 30 μm.

The PSA layers 1-a and 1-b of the resulting substrate-supported double-faced PSA sheet are covered with release film R3 and raised-pattern-bearing release film R1, respectively. By removing the release film R1 from the PSA layer 1-b, the PSA layer 1-b is exposed with the surface having an indented pattern reflecting the raised pattern of the release film R1.

Example 2

To 100 g (42.5% NV) of the toluene solution of acrylic polymer A, was added 3.5 g (as it was) of product name CORONATE L (aromatic polyisocyanate, 75% NV) available from Tosoh Corporation as a crosslinking agent and uniformly mixed to prepare a PSA composition C2. The amount of crosslinking agent added corresponds to 5.3 parts of aromatic polyisocyanate to 100 parts of acrylic polymer A in the toluene solution.

To the release face of release film R3, was applied the PSA composition C2 and allowed to dry at 100° C. for 2 minutes to form a 3 μm thick PSA layer 2-a. To the PSA layer 2-a, was adhered the first face of PET film (product name LUMIRROR #25S10 available from Toray Industries. Inc., 24 μm thick) as a support substrate. To the raised-pattern-bearing face of release film R1, was applied the PSA composition C2 and allowed to dry at 100° C. for 2 minutes to form a 3 μm thick PSA layer 2-b. Subsequently, to the PSA layer 2-b, was adhered the second face of the support substrate to prepare a substrate-supported double-faced PSA sheet having a total thickness of 30 μm.

The PSA layers 2-a and 2-b of the resulting substrate-supported double-faced PSA sheet are covered with release film R3 and raised-pattern-bearing release film R1, respectively. By removing the release film R1 from the PSA layer 2-b, the PSA layer 2-b is exposed with the surface having an indented pattern reflecting the raised pattern of the release film R1.

Example 3

To 100 g (40.0% NV) of the toluene solution of acrylic polymer B, were added 4 g of rosin-based resin A (polymerized rosin pentaerythritol ester, product name HARITACK PCJ available from Harima Chemicals Group. Inc.; softening point 118-128° C.), 4 g of rosin-based resin B (hydrogenated rosin glycerin ester, product name HARITACK SE10 available from Harima Chemicals Group, Inc.; softening point 75-85° C.) and 2 g of rosin-based resin C (hydrogenated rosin methyl ester, product name FORALYN 5020F available from Eastman Chemical Company), and 6 g of terpene-modified phenolic resin (product name SUMILITE RESIN PR-12603N available from Sumitomo Bakelite Co., Ltd.); and was further added 1.1 g (as it was) of product name CORONATE L (aromatic polyisocyanate, 75% NV) available from Tosoh Corporation as a crosslinking agent. The resultant was uniformly mixed to prepare a PSA composition C3. The amount of crosslinking agent added corresponds to 2.1 parts of aromatic polyisocyanate to 100 parts of acrylic polymer B in the toluene solution.

To the release face of release film R3, was applied the PSA composition C3 and allowed to dry at 100° C. for 2 minutes to form a 9 μm thick PSA layer 3-a. To the PSA layer 3-a, was adhered the first face of PET film (product name LUMIRROR #12S10 available from Toray Industries. Inc., 12 μm thick) as a support substrate. To the coating-layer-bearing face of release film R2, was applied the PSA composition C3 over the coating layer and allowed to dry at 100° C. for 2 minutes to form a 9 μm thick PSA layer 3-b. Subsequently, to the PSA layer 3-b, was adhered the second face of the support substrate to prepare a substrate-supported double-faced PSA sheet having a total thickness of 30 μm.

The PSA layers 3-a and 3-b of the resulting substrate-supported double-faced PSA sheet are covered with release film R3 and coating-layer-bearing release film R2, respectively. By removing the release film R2 from the PSA layer 3-b, the PSA layer 3-b is exposed, partially covered with the coating layer transferred from the release film R2.

Example 4

As the PSA sheet according to this Example, was used a substrate-supported double-faced PSA sheet having a total thickness of 30 µm with 12.5 µm thick acrylic PSA layers 4-a and 4-b placed respectively on the first and second faces of 5 µm thick PET film as the support substrate. The PSA layers 4-a and 4-b of this substrate-supported double-faced PSA sheet are covered each with release film R3. Thus, each of the PSA layers 4-a and 4-b exposed upon removal of release film R3 is a smooth and uniform adhesive face free of an indented pattern and a coating layer.

Example 5

In the preparation of the PSA composition C1 described above, the amount of crosslinking agent added to the toluene solution (42.5% NV) of acrylic polymer A was changed to 0.3 g as it was. The amount of crosslinking agent added corresponds to 0.53 part of aromatic polyisocyanate to 100 parts of acrylic polymer A in the toluene solution. Otherwise, in the same manner as the preparation of PSA composition C1, was prepared a PSA composition C5.

Using the PSA composition C5 in place of the PSA composition C1 but otherwise in the same manner as the preparation of the double-faced PSA sheet according to Example 1, was prepared a substrate-supported double-faced PSA sheet having a total thickness of 30 µm with 9 µm thick PSA layers 5-a and 5-b on the first and second face of the 12 µm thick support substrate.

The PSA layers 5-a and 5-b of the resulting substrate-supported double-faced PSA sheet are covered with release film R3 and raised-pattern-bearing release film R1, respectively. By removing the release film 1 from the PSA layer 5-b, the PSA layer 5-b is exposed with the surface having an indented pattern reflecting the raised pattern of the release film R1.

<Measurements and Evaluations>

The PSA sheet according to each Example was stored for 24 hours in an environment at 50° C. and then for at least 3 hours in a standard environment at 23° C. and 50% RH, and subsequently subjected to the following measurements and evaluations.

1. Determination of Percent Non-Bonding Area

The PSA sheets according to Examples 1 to 5 were cut to 50 mm squares. The release films covering the PSA layers 1-b to 5-b were removed to expose the PSA layers 1-b to 5-b. On horizontally-placed (levelled) glass plates (available from Matsunami Glass Ind., Ltd.; 1.35 mm thick, slide glass blue with ground and polished edges), were lightly loaded the double-faced PSA sheets according to the respective Examples with the PSA layer-exposing faces (adhesive faces) opposing the glass plates and then press-bonded in an autoclave (30° C., 0.5 MPa) for 15 minutes to obtain Samples 1 to 5 corresponding to Examples 1 to 5, respectively.

With respect to each sample immediately after removed from the autoclave, by the method described earlier, was determined the initial % non-bonding area Si (i.e. the ratio of all areas non-bonding to the glass plate relative to the total area (25 $cm^2$ here) of adhesive face).

The sample removed from the autoclave was stored at a temperature of 50° C. for 24 hours and then in a standard environment at 23° C. and 50% R1 for 30 minutes. Subsequently, by the method described earlier, was determined the % post-aging non-bonding area Sa (i.e. the ratio of all areas non-bonding to the glass plate relative to the total area (25 $cm^2$ here of the adhesive face). In determining the percent post-aging non-boding area, it was found that the non-bonding areas observed in Examples 1 to 3 were continuous lines reaching the edges of the adhesive face.

2. Determination of to-PC-Plate Peel Strength (Initial Peel Strength F0)

The PSA sheets according to Examples 1 to 5 were cut to 20 mm wide stripes to prepare test pieces for measurement. The release films covering the PSA layers 1-b to 5-b of the test pieces were removed to expose the PSA layers 1-b to 5-b. The PSA layer-exposing faces (adhesive faces) were press-bonded to a 2 mm thick polycarbonate resin plate (PC plate) as the adherend with a 2 kg roller moved back and forth once.

The samples were stored in a standard environment at 23° C. and 50% RH for 30 minutes. In the standard environment, using a universal tensile/compression tester (product name TG-1kN available from Minebea Co., Ltd.), was determined the 180° peel strength (N/20 mm) for each at a tensile speed of 300 mm/min based on JIS Z0237:2000. For each, three measurements were taken (i.e. N=3) and the measurement values were averaged to determine the initial peel strength F0.

(Post-Aging Peel Strength F1)

The PSA sheets according to Examples 1 to 5 were cut to 20 mm wide stripes to prepare test pieces for measurement. The release films covering the PSA layers 1-b to 5-b of the test pieces were removed to expose the PSA layers 1-b to 5-b. The PSA layer-exposing faces (adhesive faces) were press-bonded to the PC plate as the adherend with a 2 kg roller moved back and forth once.

The samples were stored in a hot and humid environment at 85° C. and 85% RH for 24 hours and then in a standard environment at 23° C. and 50% RH for 30 minutes. In the same manner as for the measurement of initial peel strength F0, was determined the 180° peel strength (N/20 mm) for each. For each, three measurements were taken (i.e. N=3) and the measurement values were averaged to determine the post-aging peel strength F1.

As for the PC plate, was used product No. PC1600 available from C. I. Takiron Corporation. It has been known that the PC plate outgasses at least 100 µL/g when heated at 85° C. for 15 hours in the outgassing test.

3. Evaluation of Bonding Reliability

From the results obtained above, the peel strength retention rate of the PSA sheet according to each Example was determined as the ratio of post-aging peel strength F1 to initial peel strength FR. The results are shown in Table 1.

A larger peel strength retention rate (F1/F0) value indicates that the decrease in adhesive strength due to the exposure to the environment causing the adherend (the PC plate here) to outgas. To facilitate understanding of the test results, the following classification was applied: "E" (excellent bonding reliability) when F1/F0≥0.80, "G" (good bonding reliability) when 0.70≤F1/F0<0.80. "A" (acceptable bonding reliability for practical use) when 0.60≤F1/F0<0.70, and "P" (poor bonding reliability) when F1/F0<0.60. The results are also shown in Table 1.

TABLE 1

|  |  | Ex. 1 | Ex. 2 | Ex. 3 | Ex. 4 | Ex. 5 |
|---|---|---|---|---|---|---|
| % Non-bonding area to glass plate | Initial Si (immediately after press-bonded) | 15 | 26 | 21 | 2 | 11 |
|  | Post-aging Sa (50° C. 24 h) | 12 | 21 | 19 | 0 | 0 |
|  | Non-bonding area retention rate (Sa/Si) | 0.80 | 0.81 | 0.90 | 0.00 | 0.00 |
| To-PC-plate peel strength (N/20 mm) | F0 (23° C., 50% RH, after 30 min) | 6.2 | 3.4 | 7.2 | 8.2 | 2.3 |
|  | F1 (85° C., 85% RH, after 24 h) | 5.3 | 2.7 | 7.0 | 0.9 | 1.1 |
| Bonding reliability | Peel strength retention rate (F1/F0) | 0.85 | 0.79 | 0.97 | 0.11 | 0.48 |
|  | Evaluation | E | G | E | P | P |

As evident from the results shown in Table 1, the PSA sheets of Examples 1 to 3 showed high peel strength retention rates even upon the exposure to the hot and humid environment after applied to the outgassing adherend (the PC plate here), exhibiting good bonding reliability. This may be because of their good outgassed-gas release properties; in other words, because, with having at least 10% post-aging non-bonding area, the gas outgassed from the adherend in the hot and humid environment can flow along the non-bonding areas to be released from the edges of the PSA layer to the outside. In addition, the PSA sheets according to Examples 1 to 3 also showed good air release properties while being loaded and press-bonded onto the glass plate.

On the other hand, with respect to the PSA sheets of Examples 4 and 5 with little post-aging non-bonding areas, the adhesive strength decreased greatly upon exposure to the hot and humid environment. This is presumed that the PSA sheets of Examples 4 and 5 had poor outgassed-gas release properties and the outgassed gas trapped between the adherend and the adhesive face formed bubbles which, in turn, caused loosening of the bond between the adherend and the PSA layer.

The following experiments were further carried out to investigate why the PSA sheets according to Examples 1 to 3 were much superior in peel strength retention rate as compared to the PSA sheets according to Examples 4 and 5.

In particular, except that the PC plate was used in place of the glass plate, in the same manner as for the measurement of percent initial non-bonding area Si, was determined the percent to-PC-plate initial non-bonding area S0. In addition, except that the PC plate was used in place of the glass plate and the measurement was carried out after the sample removed from the autoclave was stored at 85° C. and 85% RH for 24 hours and then in the standard environment at 23° C. and 50% RH, in the same manner as for the measurement of percent post-aging non-bonding area Sa, was determined the percent to-PC-plate post-aging (post-heating/humidifying) non-bonding area S1. Furthermore, except that the PC plate was used in place of the glass plate and the measurement was carried out after the sample removed from the autoclave was stored at a temperature of 60° C. for three days and then in the standard environment at 23° C. and 50% RH for 30 minutes, in the same manner as for the measurement of percent post-aging non-bonding area Sa, was determined the percent to-PC-plate post-aging (post-heating/humidifying) non-bonding area S2. The results are shown in Table 2.

TABLE 2

|  |  | Ex. 1 | Ex. 2 | Ex. 3 | Ex. 4 | Ex. 5 |
|---|---|---|---|---|---|---|
| % Non-bonding area to PC plate | Initial S0 (after 30 min) | 17 | 27 | 20 | 6 | 18 |
|  | Post-aging S1 (85° C., 85% RH, 24 h) | 18 | 23 | 17 | 40 | 48 |
|  | Post-aging S2 (60° C., 3 days) | 14 | 25 | 19 | 27 | 37 |
| Increase in to-PC-plate non-bonding area percentage (S1-S0) (%) |  | 1 | −4 | −3 | 40 | 30 |

As shown in Table 2, with respect to the PSA sheets of Examples 4 and 5 having low peel strength retention rates, after applied to the PC plate and stored in the hot and humid environment at 85° C. and 85% RH for 24 hours, the area of non-bonding areas significantly increased as compared to the initial state (i.e. immediately after press-bonded in the autoclave). In the samples stored in the hot and humid environment, visual inspection also revealed clear accumulation of bubbles between their adhesive faces and the PC plate. A similar tendency was found also with respect to the samples stored at 60° C. for three days. These results indicate that, in the evaluation of bonding reliability, with respect to the PSA sheets of Examples 4 and 5, the gas outgassed from the PC plate in the hot and humid environment was trapped between the PC plate and their adhesive faces, thereby forming bubbles; and these bubbles loosened the bond between the adherend and the PSA layers, resulting in a post-aging peel strength significantly lower than the initial value and degrading the bonding reliability. As for the PSA sheets according to Examples 1 to 3, it is presumed that, even when stored in the hot and humid environment, they were able to maintain outgassed-gas release properties; and therefore, bubble formation caused by entrapped outgassing was avoided and high peel strength retention rates were obtained.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
10 film substrate
20 PSA layer
30 indentation
40 indented pattern 42, 44 stripe patterns
50 groove (linearly extending part)
60 raised pattern
62 ridge (linearly extending part)
100 release liner
110 release-linered PSA sheet
201 PSA sheet
201A adhesive face
210 film substrate
220 PSA layer
220A PSA layer surface
230 coating layer
240 coating layer pattern
242, 244 stripe patterns
250 stripe (linearly extending part)
300 PSA sheet (substrate-supported double-faced PSA sheet)
301, 302 release liners
310 film substrate
321, 322 PSA layers
330 coating layer
410 release liner
420 releasable support

The invention claimed is:

1. A pressure-sensitive adhesive sheet comprising a pressure-sensitive adhesive layer that forms an adhesive face, wherein:
in an aging test where the adhesive face is press-bonded to a glass plate and the resultant is stored at 50° C. for 24 hours, the pressure-sensitive adhesive sheet has a percent post-aging non-bonding area Sa of 5% or higher, with Sa defined as the ratio of all areas non-bonding to the glass plate relative to the total area of the adhesive face.

2. The pressure-sensitive adhesive sheet according to claim 1, wherein the post-aging-test non-bonding areas are formed continuously up to edges of the adhesive face.

3. The pressure-sensitive adhesive sheet according to claim 1, wherein indentations are formed on the adhesive face, forming a pattern in planar view of the pressure-sensitive adhesive layer; and the post-aging-test non-bonding areas are formed along the pattern.

4. The pressure-sensitive adhesive sheet according to claim 3, wherein the indentations have a depth of 0.2 µm or greater.

5. The pressure-sensitive adhesive sheet according to claim 3, wherein the pattern formed with the indentations is formed of a first stripe pattern and a second stripe pattern placed to intersect the first stripe pattern, wherein the first stripe pattern in the pattern formed with the indentations is formed with grooves having a width of 0.01 mm or greater and 2 mm or less.

6. The pressure-sensitive adhesive sheet according to claim 5, wherein the grooves forming the first stripe pattern in the pattern formed with the indentations have a width of 0.05 mm or greater and 2 mm or less.

7. The pressure-sensitive adhesive sheet according to claim 1, wherein a coating layer is placed on the surface of the pressure-sensitive adhesive layer while partially covering the surface to arrange a pattern in planar view of the pressure-sensitive adhesive layer, the pressure-sensitive adhesive sheet constituted so that the post-aging-test non-bonding areas are formed along the pattern arranged with the coating layer.

8. The pressure-sensitive adhesive sheet according to claim 7, wherein:
the pattern arranged with the coating layer is formed of a first stripe pattern and a second stripe pattern placed to intersect the first stripe pattern, and
the first stripe pattern in the pattern arranged with the coating layer are formed with stripes having a width of 1.0 mm or greater and 10 mm or less.

9. The pressure-sensitive adhesive sheet according to claim 8, wherein the stripes forming the first stripe pattern in the pattern arranged with the coating layer have an interval of 1.8 mm or greater and 10 mm or less.

10. The pressure-sensitive adhesive sheet according to claim 8, wherein the stripes forming the first stripe pattern in the pattern arranged with the coating layer have an interval of 2.5 mm or greater and 8 mm or less.

11. The pressure-sensitive adhesive sheet according to claim 1, constituted so that the post-aging-test non-bonding areas form a lattice pattern.

12. The pressure-sensitive adhesive sheet according to claim 1, having a percent initial non-bonding area Si of 5% or higher and 35% or lower, with Si defined as the ratio of all areas non-bonding to the glass plate relative to the total area of the adhesive face immediately after the adhesive face is press-bonded to the glass plate.

13. The pressure-sensitive adhesive sheet according to claim 1, comprising a film substrate and the pressure-sensitive adhesive layer placed on at least one face of the film substrate.

14. A composite body comprising the pressure-sensitive adhesive sheet according to claim 1 and a member having a surface formed of a plastic material having an outgassing amount of 100 µL/g or greater in an outgassing test where it is heated at 85° C. for 15 hours, with the pressure-sensitive adhesive sheet adhered on the surface formed of the plastic material.

15. The composite body according to claim 14, wherein the plastic material comprises at least one species selected from the group consisting of a polycarbonate resin, acrylic resin, polystyrene resin, acrylonitrile-butadiene-styrene copolymer resin and vinyl chloride resin.

* * * * *